No. 828,279. PATENTED AUG. 7, 1906.
J. FARRELL.
MACHINE FOR MAKING BASKETS.
APPLICATION FILED JUNE 6, 1901.
11 SHEETS—SHEET 2.
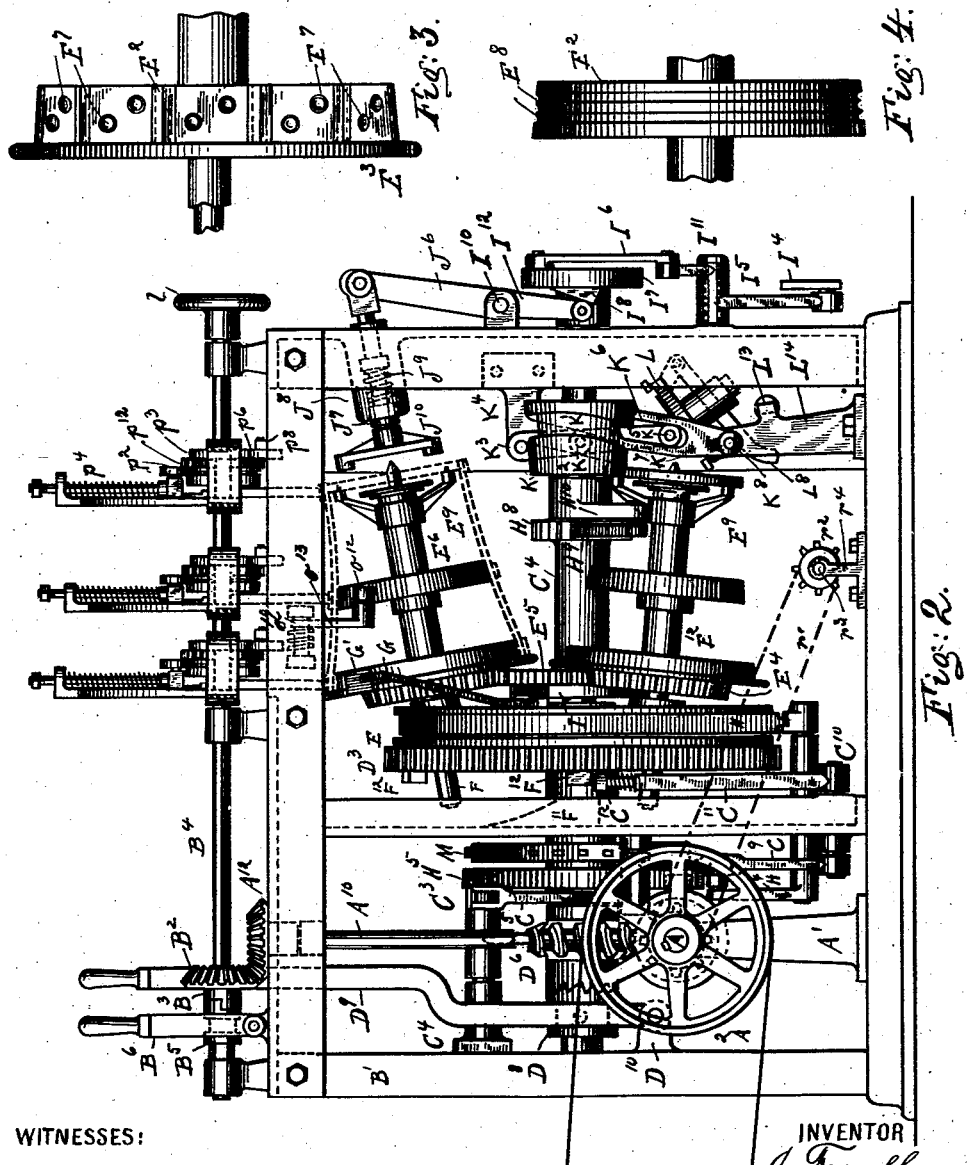
WITNESSES:
F. Stallman
Dr. Hall
INVENTOR
J. Farrell

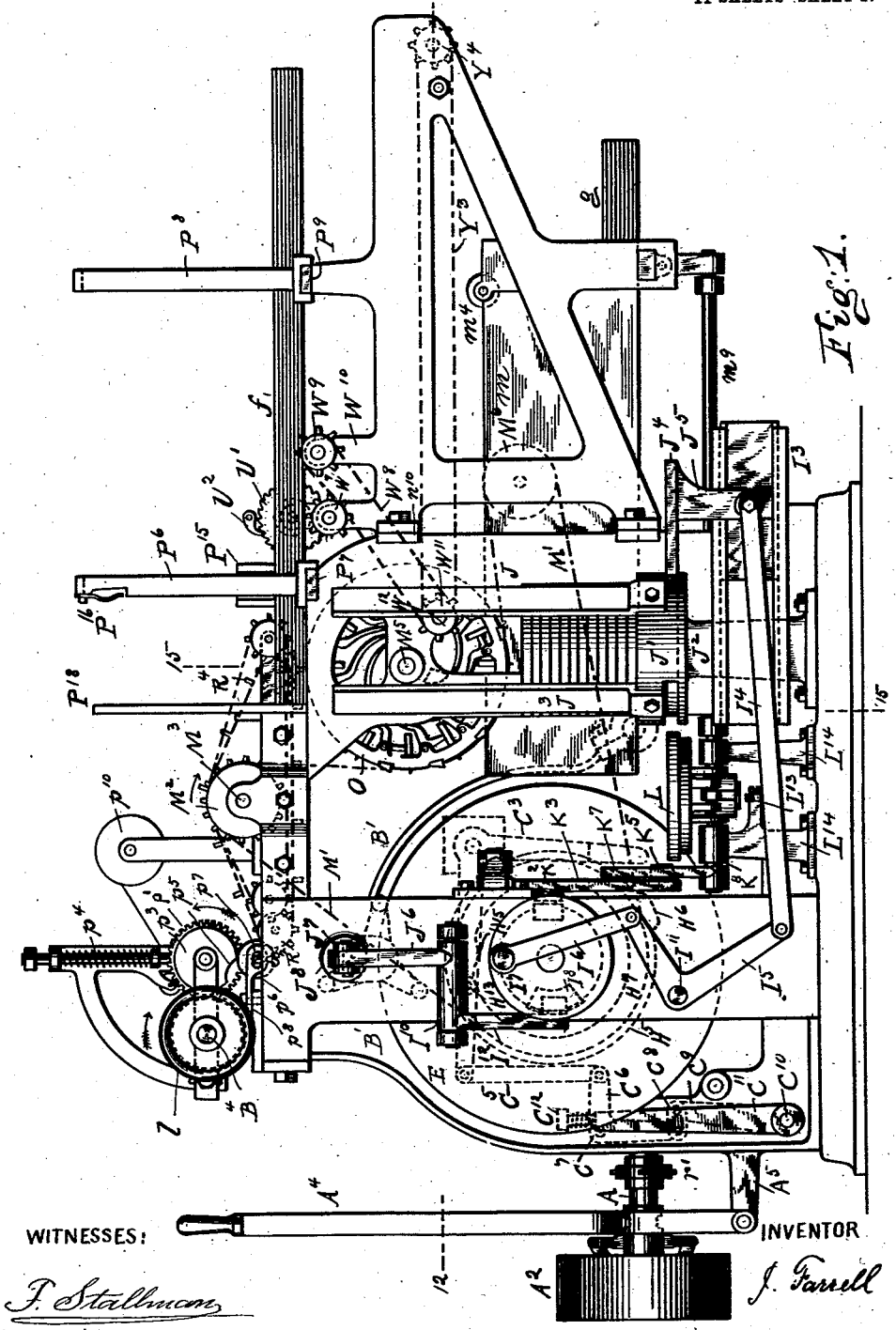

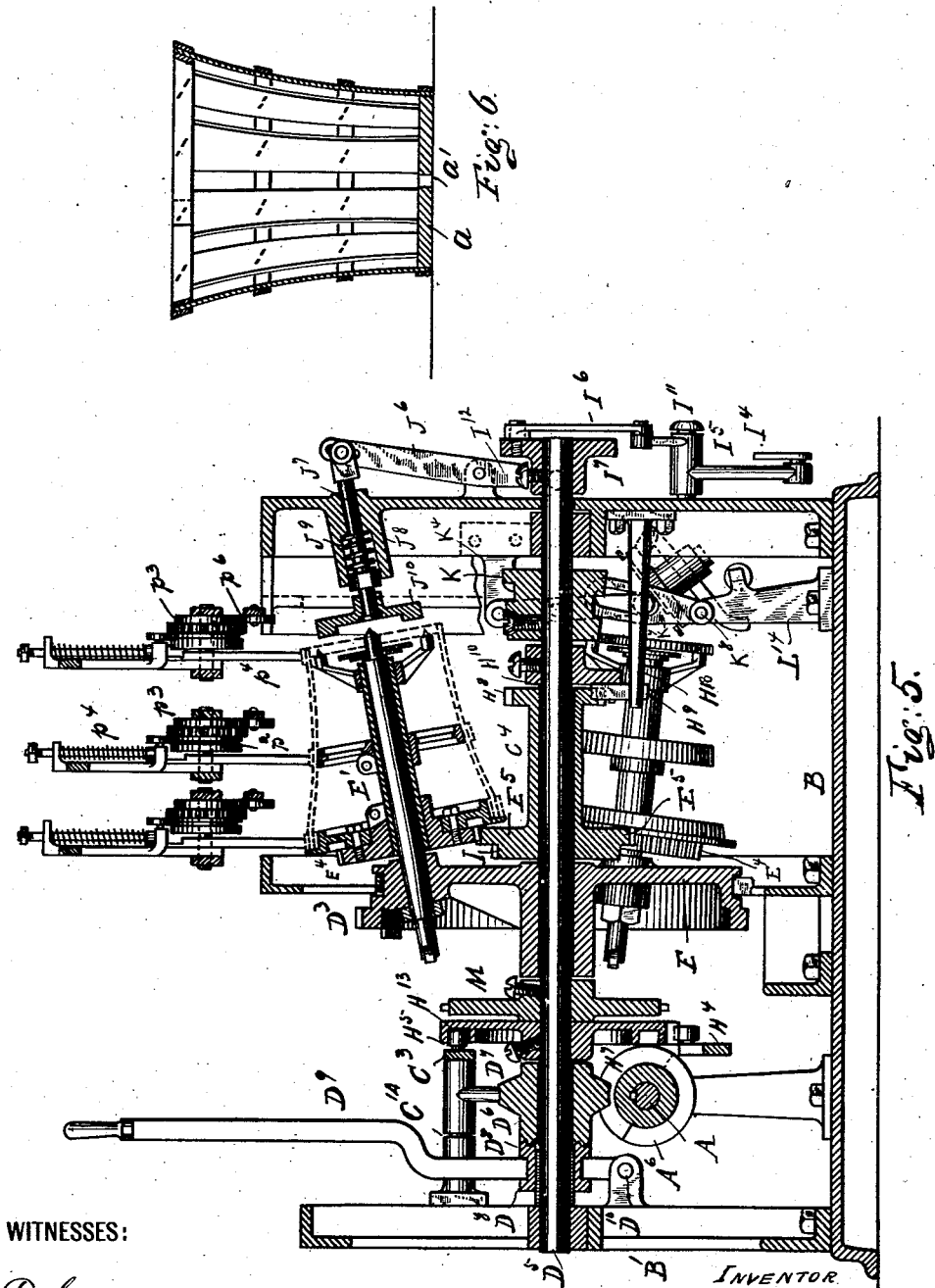

No. 828,279. PATENTED AUG. 7, 1906.
J. FARRELL.
MACHINE FOR MAKING BASKETS.
APPLICATION FILED JUNE 6, 1901.
11 SHEETS—SHEET 4.
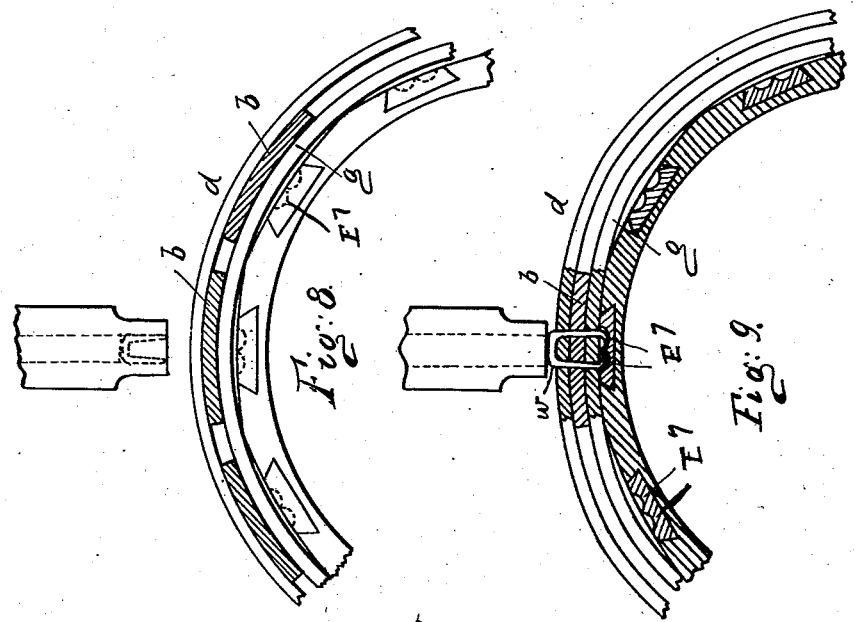
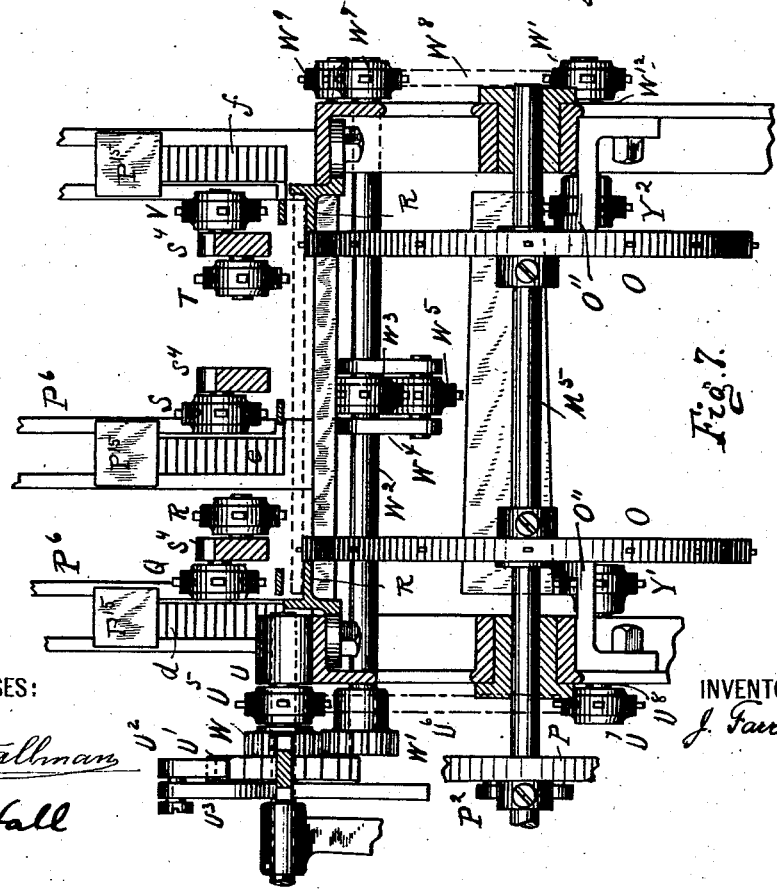
WITNESSES:
F. Stallman
M. Hall
INVENTOR
J. Farrell

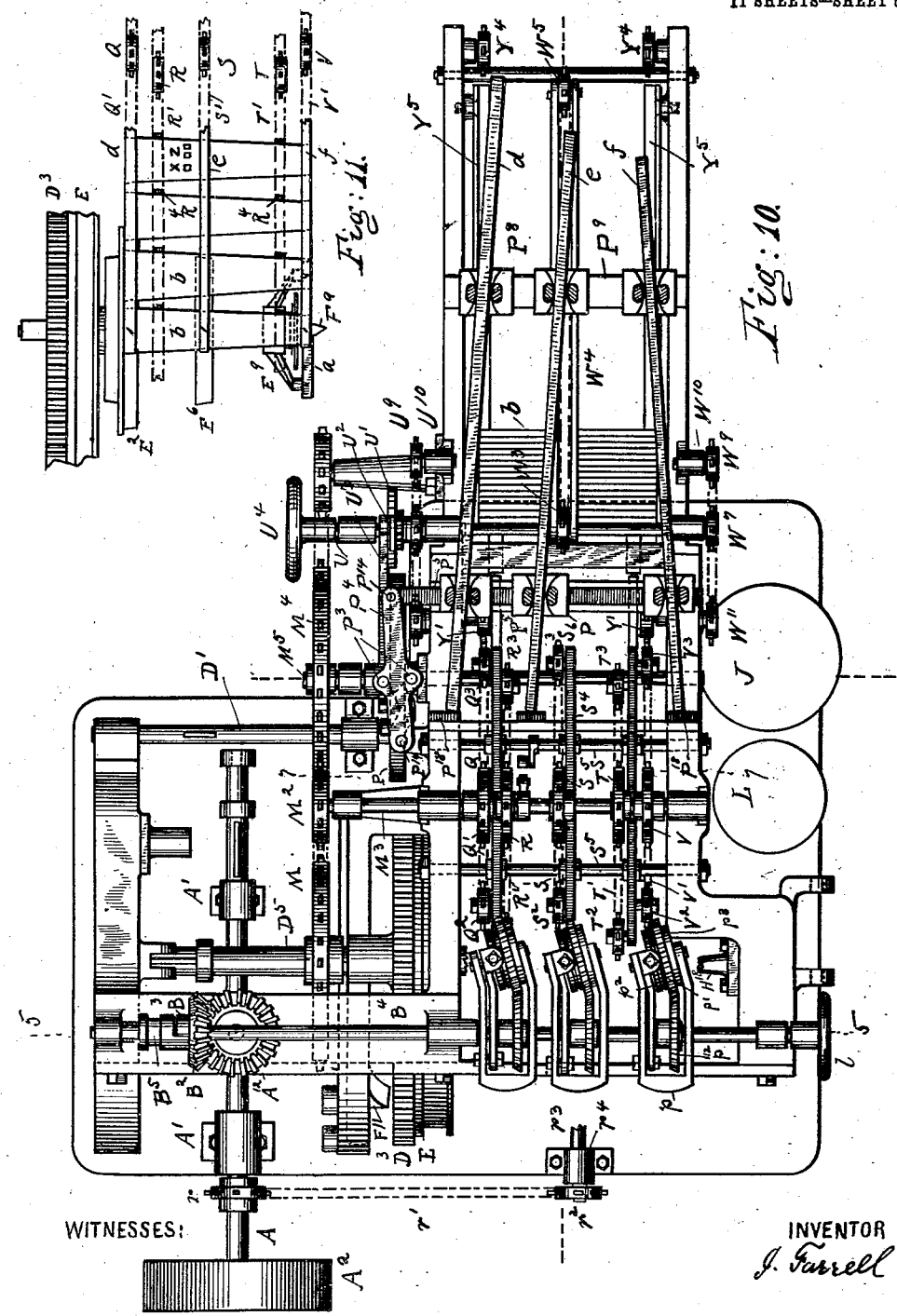

No. 828,279. PATENTED AUG. 7, 1906.
J. FARRELL.
MACHINE FOR MAKING BASKETS.
APPLICATION FILED JUNE 6, 1901.
11 SHEETS—SHEET 6.
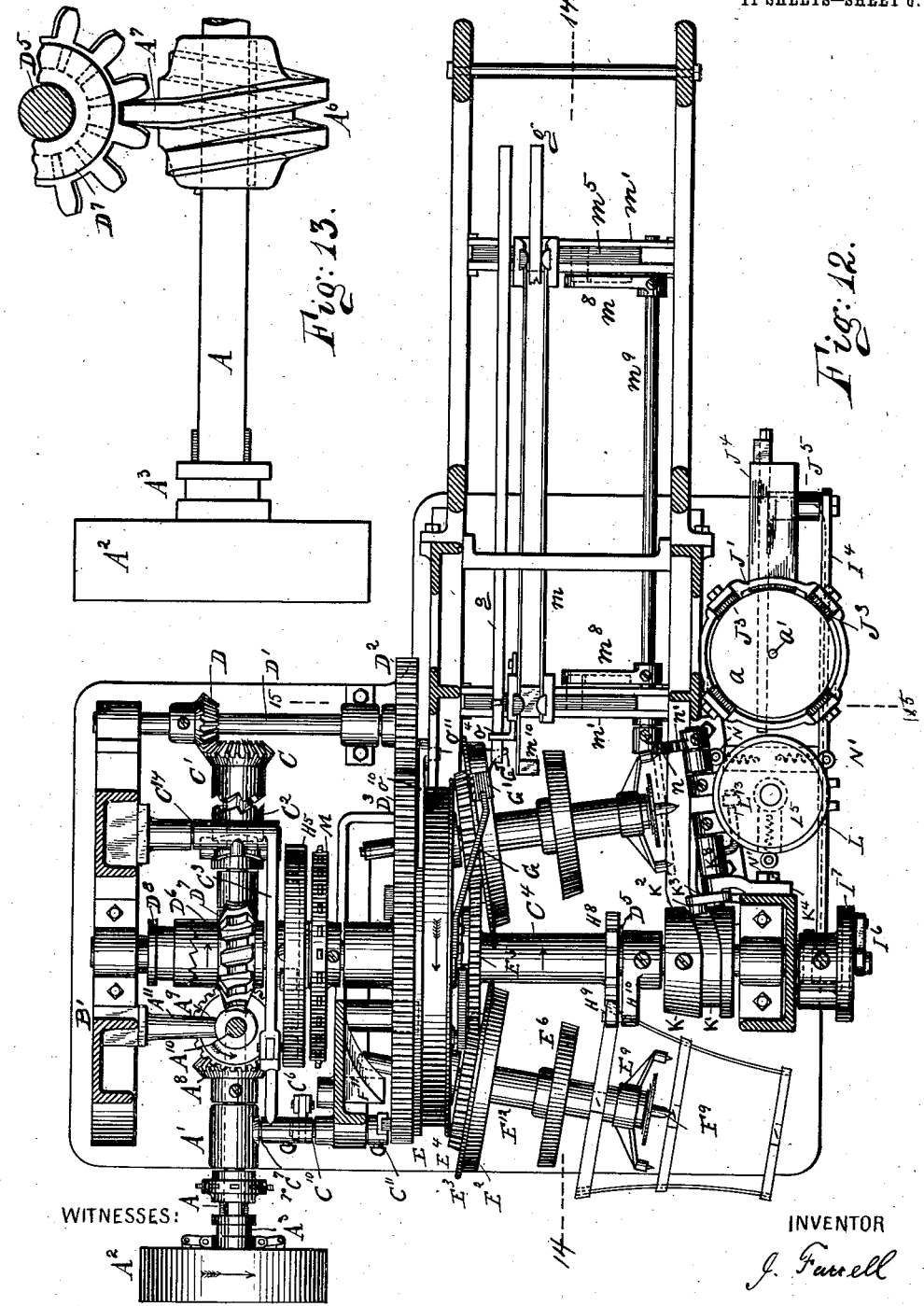
WITNESSES:
F. Stallman
Dr. Hall
INVENTOR
J. Farrell

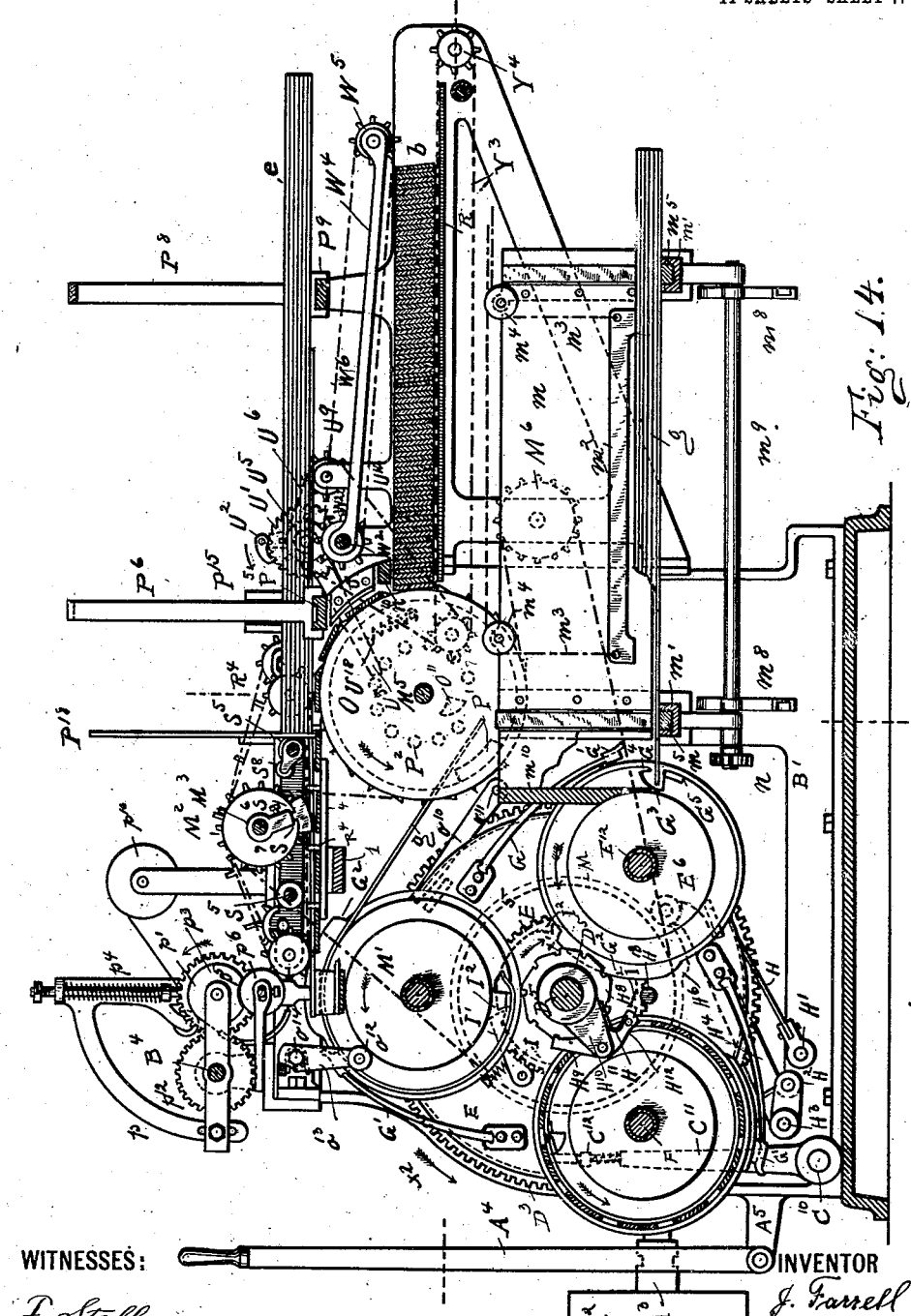

No. 828,279. PATENTED AUG. 7, 1906.
J. FARRELL.
MACHINE FOR MAKING BASKETS.
APPLICATION FILED JUNE 6, 1901.
11 SHEETS—SHEET 8.
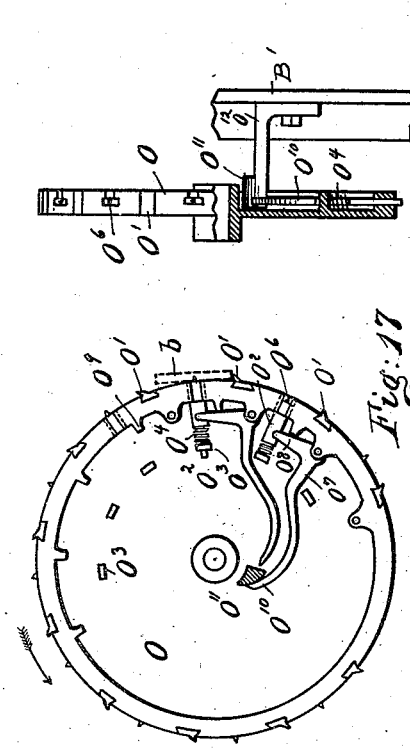
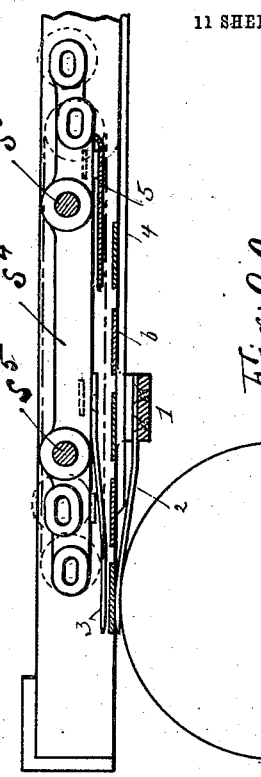
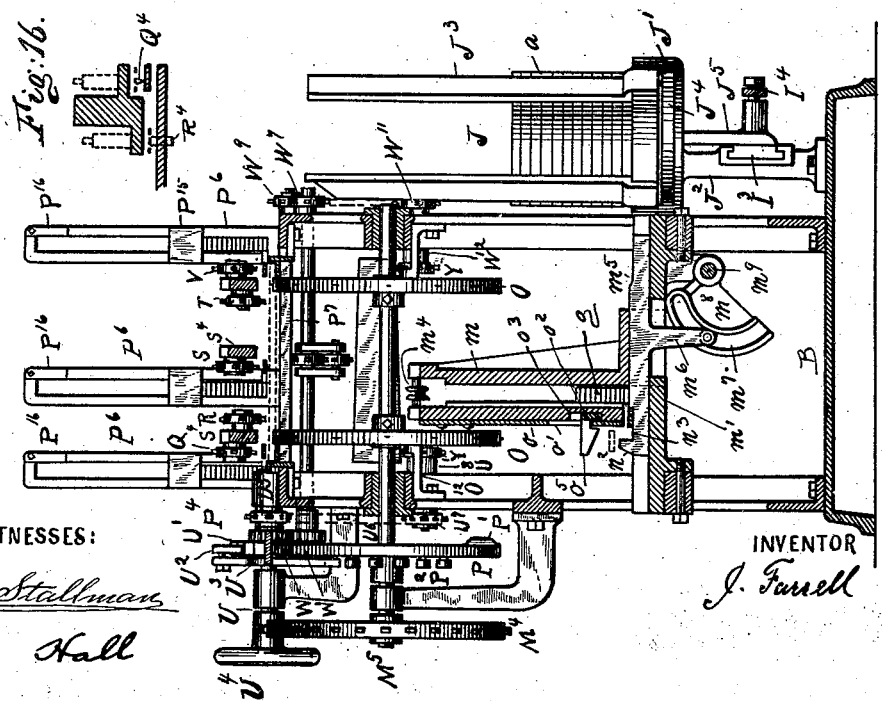
WITNESSES:
F. Stallman
In Hall
INVENTOR
J. Farrell

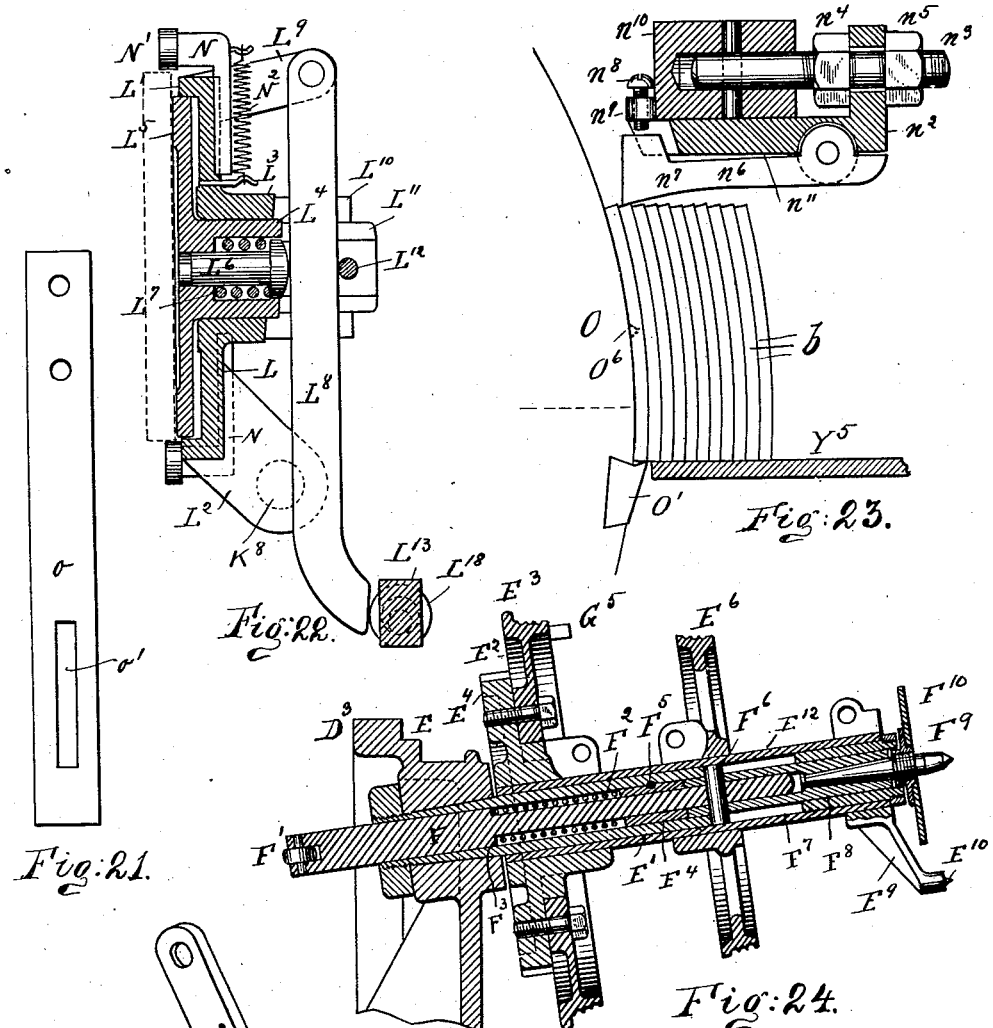

No. 828,279. PATENTED AUG. 7, 1906.
J. FARRELL.
MACHINE FOR MAKING BASKETS.
APPLICATION FILED JUNE 6, 1901.
11 SHEETS—SHEET 10.
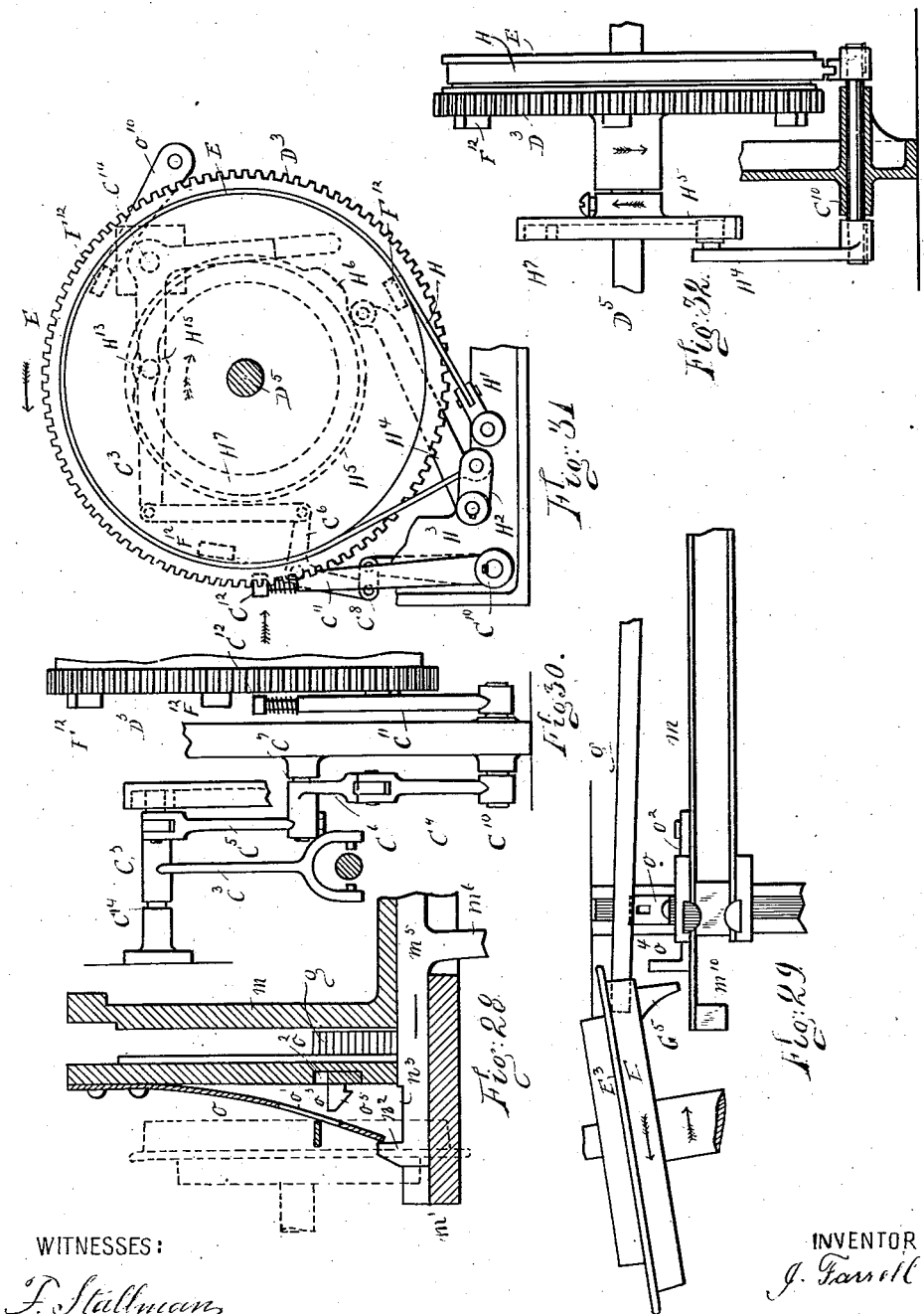
WITNESSES:
INVENTOR No. 828,279. PATENTED AUG. 7, 1906.
J. FARRELL.
MACHINE FOR MAKING BASKETS.
APPLICATION FILED JUNE 6, 1901.
11 SHEETS—SHEET 11.
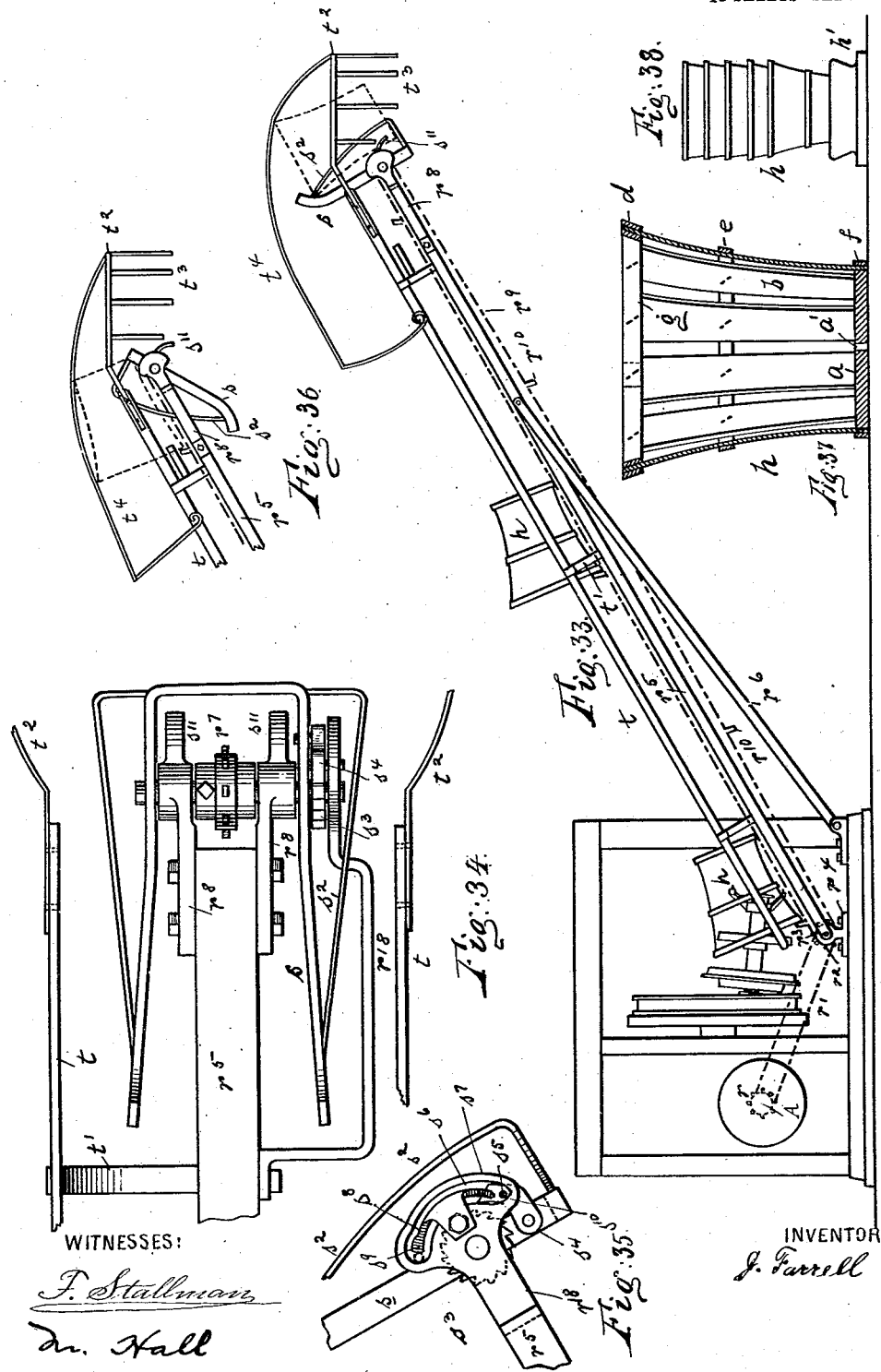
WITNESSES:
F. Stallman
M. Hall
INVENTOR
J. Farrell

UNITED STATES PATENT OFFICE.

JOHN FARRELL, OF NEWTON, NEW JERSEY, ASSIGNOR OF ONE-FOURTH TO JAMES A. WATSON, OF WASHINGTON, DISTRICT OF COLUMBIA.

MACHINE FOR MAKING BASKETS.

No. 828,279.     Specification of Letters Patent.     Patented Aug. 7, 1906.

Application filed June 6, 1901. Serial No. 63,337.

*To all whom it may concern:*

Be it known that I, JOHN FARRELL, a citizen of the United States, and a resident of Newton, in the county of Sussex and State of New Jersey, have invented certain new and useful Improvements in Machines for Making Baskets, of which the following is a specification.

This invention relates to improvements in machines for making baskets, and more particularly to various improvements in the machine illustrated and described in my pending application, Serial No. 652,992, filed September 25, 1897.

The object of my invention is to provide a new and improved basket-making machine which is simple in construction, strong, durable, effective, reliable, and automatic in operation.

In the accompanying drawings, in which like characters of reference indicate like parts in all the figures, Figure 1 is a side elevation of my improved machine for making baskets. Fig. 2 is a front elevation of the same, parts being omitted. Figs. 3 and 4 are enlarged detail views of different constructions of the end disk of a basket-form. Fig. 5 is a vertical transverse sectional view of the machine on the line 5 5 of Fig. 10. Fig. 6 is a vertical sectional view of a modified style of basket. Fig. 7 is an enlarged detail transverse vertical sectional view of parts of the machine on the line 7 7 of Fig. 10. Figs. 8 and 9 are detail views illustrating the stapling operation. Fig. 10 is a plan view of the machine. Fig. 11 is a plan view of part of the machine. Fig. 12 is a horizontal sectional view of the machine on the line 12 12 of Fig. 1. Fig. 13 is an enlarged detail side view of part of the driving-gear. Fig. 14 is a vertical longitudinal sectional view of the machine on the line 14 14 of Fig. 12. Fig. 15 is a vertical transverse sectional view on the line 15 15 of Fig. 12. Fig. 16 is a detail vertical transverse sectional view similar to Fig. 7. Fig. 17 is a side view of the stave-lifting disk, the cam being in section. Fig. 18 is an enlarged detail side view of one of the sliding bolts in said disks. Fig. 19 is an edge view of the stave-elevating disk, parts being in section. Fig. 20 is an enlarged longitudinal sectional view of the top part of the machine, showing the guides for the staves. Fig. 21 is a detail side view of the spring for throwing the inner hoop-strip laterally. Fig. 22 is an enlarged sectional view of the device for applying the bottoms on the basket-forms. Fig. 23 is a sectional view of the means for holding in place the staves at the place at which they are taken up by the elevating-disks. Fig. 24 is a longitudinal sectional view of a basket-form. Fig. 25 is a detail perspective view of the latch on the receptacle for the inner hoop-strips. Fig. 26 is an enlarged vertical transverse sectional view of the bottom part of the receptacle for the inner hoop-strips and the slide in the same. Fig. 27 is a detail view of the roller $L^{18}$ of Fig. 22. Fig. 28 is a vertical transverse sectional view of the receptacle for the inner hoop-strips at the front end of the same. Fig. 29 is a plan view of the same. Figs. 30, 31, and 32 are detail views showing the buffer and brake and means for operating them. Figs. 33 to 36 are various views of the basket elevating and stacking devices. Fig. 37 shows a basket in vertical section. Fig. 38 shows a stack of baskets.

All the mechanisms of this machine are operated from a single driven shaft A, which will be designated as the "main" shaft and which makes one revolution for each stave applied and one revolution every time the forms are shifted. Suitable power-transmitting contrivances are provided for operating the several mechanisms at will and independently of each other from this main shaft A. The said shaft A is mounted horizontally in standards $A'$ $A'$ on the base B of the machine-frame $B'$ and carries at its outer end the belt-pulley $A^2$, mounted loosely and adapted to be engaged by a clutch-sleeve $A^3$ of any suitable construction, mounted on the shaft A to turn with the same and to slide on the said shaft A in the direction of the length of the latter. This clutch-sleeve $A^3$ can be shifted into and out of engagement with the belt-pulley $A^2$ by a hand-lever $A^4$, engaging the clutch mechanism and pivoted to the frame $B'$ of the machine at $A^5$. A worm $A^6$ is fixed on the shaft A and is so shaped and constructed that a portion $A^7$ of its thread runs at right angles to the longitudinal axis of the shaft A in contradistinction to the pitch of the remaining part of the worm, all for a purpose that will be set forth hereinafter. The shaft A also carries a bevel cog-wheel $A^8$, Fig. 12, fixed thereon and engaging a bevel cog-wheel $A^9$, fixed on the lower end of a vertical shaft $A^{10}$, mounted to rotate in horizontal arms $A^{11}$ of the machine-frame $B'$. A bevel cog-wheel $A^{12}$, Fig. 10, on the upper end of the shaft $A^{10}$, engages a bevel cog-wheel $B^2$ on a clutch-sleeve $B^3$, mounted loosely on a horizontal shaft $B^4$ on the top of the machine-frame and serving to operate the nailing or stapling mechanisms that will be described hereinafter. A sliding clutch member $B^5$, mounted on the shaft $B^4$ to turn with the same, can be brought into and out of engagement with the clutch-sleeve $B^3$ by means of a suitable handle-lever $B^6$. A clutch $C'$, provided at one end with a bevel cog-wheel $C$, is mounted loosely on the inner end of the shaft $A$ in such a manner that it cannot move lengthwise on said shaft, but can turn on the same. A clutch-sleeve $C^2$, adapted to engage the clutch-sleeve $C'$, is mounted on the shaft $A$ to turn with and slide lengthwise on the same and can be shifted into and out of engagement with the clutch-sleeve $C'$ by means of an angle-lever $C^3$, Fig. 31, pivoted to the frame $B'$ at $C^{14}$, one end of said angle-lever $C^3$ engaging the clutch-sleeve $C^2$ and the other end being connected by a connecting-rod $C^5$ with one arm of an angle-lever $C^6$, pivoted at $C^7$ to the machine-frame $B'$, the other arm of this second angle-lever $C^6$ being connected by a short link $C^8$ with an upwardly-extending arm $C^9$ of a horizontal rock-shaft $C^{10}$, from which shaft an arm $C^{11}$ extends upward and which carries a spring-buffer $C^{12}$ at its upper end.

The bevel cog-wheel $C$ is engaged with a bevel cog-wheel $D$, of sightly less diameter, fixed on a horizontal shaft $D'$, mounted in the frame $B'$ and carrying a cog-wheel $D^2$, engaging a cog-wheel $D^3$, mounted loosely on the horizontal shaft $D^5$ in the machine-frame $B'$. A clutch-sleeve $D^6$ is mounted loosely on the shaft $D^5$ and carries a worm-wheel $D^7$, which is engaged with the worm $A^6$ on the shaft $A$. A clutch-sleeve $D^8$ is mounted on the shaft $D^5$ to slide lengthwise of and to rotate with said shaft, and it can be shifted into and out of engagement with the clutch-sleeve $D^6$ by means of the manipulating-lever $D^9$, pivoted to the frame $B'$ at $D^{10}$. A disk $E$ is made integral with the cog-wheel $D^3$ to rotate with the same and constitutes a form-carrier. From said disk $E$ three tubular shafts $E'$, Fig. 24, project outward at an angle to the side of the disk and these three shafts are separated one hundred and twenty degrees from each other. On each tubular shaft $E'$ a sleeve $E^{12}$ is mounted loosely, and on the inner end of such sleeve a circular frame $E^2$ is fixed, which is of a diameter equal to the inner diameter of the mouth of the basket and has a raised flange $E^3$ at its outer side. This frame $E^2$ is secured to a cog-wheel $E^4$, and these several cog-wheels $E^4$ engage a cog-wheel $E^5$, fixed on a sleeve $C^4$, mounted loosely on the shaft $D^5$, (see Fig. 5,) and these cog-wheels are of such relative sizes that when the wheel $E^5$ makes one rotation the cog-wheels $E^4$ each make one rotation and a fraction of a rotation. About midway of the length of the sleeve $E^{12}$ a circular frame $E^6$ is fixed on the same and its diameter is equal to the internal diameter of the basket at about half its height.

The frames $E^2$ and $E^6$ may be made polygonal instead of circular, as shown in Figs. 8 and 9, and these frames are provided with pairs of recesses $E^7$ or with circumferential grooves $E^8$ in the rims for bending or clenching the inner ends of the staples that are used for securing the basket-hoops on the staves. At the outer end of the sleeve $E^{12}$ three outwardly-equidistant radial arms $E^9$ are secured or a disk in place thereof and their outer ends are bounded by a circle of a diameter equal to the inner diameter of the bottom of the basket or less. A pin $E^{10}$ projects from the end of each arm $E^9$, as shown in Fig. 24. A rod $F$ is mounted to move longitudinally in the tubular shaft $E'$ and projects from the inner end of the same, and the projecting end carries a roller $F'$. A helical spring $F^2$ surrounds part of such rod $F$ and with one end bears against an annular shoulder $F^3$ of the rod $F$ and with the other end against a sleeve $F^4$, fixed by a pin $F^5$, in the tubular shaft $E'$, and said sleeve $F^4$ guides the rod $F$ in its lengthwise movements. The spring $F^2$ thus presses the rod $F$ inward lengthwise and presses a cross-pin $F^6$ of said rod against the inner ends of longitudinal slots $F^7$ in the tubular shaft $E'$.

A tubular extension $F^8$ is secured on the end of the rod $F$ opposite the one carrying the roller $F'$ and from the same a pin $F^9$ projects beyond the free end of the tubular shaft $E'$, and this pin carries a disk or plate $F^{10}$ a short distance from the end of the pin $F^9$, so that the end of the pin projects beyond this disk, and the disk is within the three arms $E^9$.

The hollow shafts $E'$ and the parts thereon constitute basket-forms, and these forms are carried by the form-carrier $E$, already mentioned.

A cam $F^{11}$, Fig. 2, is formed on one of the uprights of the frame $B'$ in the paths of those ends of the rods $F$ carrying the rollers $F'$, so that as said rods are moved downward with the forms the rollers $F'$ on their projecting ends run on this cam $F^{11}$, whereby the rods are moved lengthwise in the direction toward the smaller end of the form. Thereby the finished basket is pushed off the form and the spring $F^2$ is compressed, and when the roller $F'$ slides off the cam $F^{11}$ the spring $F^2$ expands and throws the rod $F'$ back into its original position in the form.

The disk $E$ has three equidistant stops $F^{12}$, which can strike against the buffer $C^{12}$ in the upper end of the arm $C^{11}$.

For each basket-form, of which there are three on the form-carrier, a spring-pressed arm G is secured on the carrier-disk E, and on the free end of each spring G a U-shaped curved clip G' is formed, which straddles and rests on the flange $E^3$ of the large disk or frame $E^2$ of a basket-form, said flange having parts of its edge made higher to form a cam $G^2$, Fig. 14. The end of the clip G' is bent up to facilitate the beveled end of the cam $G^2$ passing under and raising it.

Each large end disk or frame $E^2$ of each form has a recess $G^3$, Fig. 14, at one side of which a lip $G^4$ is formed, and at the other side of the recess a lug $G^5$ projects laterally from said frame or disk for a purpose that will be set forth hereinafter.

A brake-band H, Fig. 31, surrounds the rim of the disk E and has one end secured to the frame B' at H', and the other end is attached to the arm $H^2$ of a rock-shaft $H^3$, having an arm $H^4$, which rests on the rim of the cam-disk $H^5$, fixed on the shaft $D^5$, and is provided with a cam projection $H^6$ on its rim and with a cam-groove $H^7$ in one side, in which a cam-recess $H^{15}$ is formed. When the cam projection $H^6$ of the cam-disk $H^5$ acts on the arm $H^4$, the rock-shaft $H^3$ is turned slightly, causing the brake-band H to be applied, and of course this brake-band remains applied only as long as the cam projection $H^6$ acts on the arm $H^4$. A roller $H^{13}$ on the angle-lever $C^3$ travels in this cam-groove $H^7$. A toothed wheel $H^8$ is formed on that end of the sleeve $C^4$ opposite the one carrying the cog-wheel $E^5$ and is engaged by a pawl $H^9$, pivoted on an arm $H^{10}$ of the shaft $D^5$, which pawl is pressed against the rim of the toothed wheel $H^8$ by a spring $H^{11}$, Fig. 14. This pawl has an arm $H^{12}$, that can strike against a pin $H^{18}$, projecting from a standard of the frame B'. The sleeve $C^4$ is rotated from the shaft $D^5$ by means of this arm $H^{10}$, pawl $H^9$, and toothed wheel $H^8$.

A pawl I', pivoted to the disk E, rests upon the rim of a disk I, attached to the side of the toothed wheel $E^5$, and said disk I has three notches $I^2$ in its rim, into which notch the end of the pawl I can drop, as shown in dotted lines in Fig. 14.

The basket-bottoms $a$, each having a central hole $a'$, are placed one upon the other in a vertical hopper J, consisting of a horizontal base J' on a suitable standard $J^2$ and vertical guides $J^3$, attached to said base. A pusher $J^4$ is guided to reciprocate over the base J' and has a downwardly-extending arm $J^5$, which is guided to reciprocate in a horizontal guide $I^3$ on the standard $J^2$. A connecting-rod $I^4$ connects the arm $J^5$ with one end of an angle-lever $I^5$, pivoted at $I^{11}$ to one of the standards of the frame B', and the other end of this angle-lever is connected by a link $I^6$ eccentrically with a disk $I^7$, fixed on the end of the shaft $D^5$. (See Figs. 2 and 5.) A cam projection $I^8$ on the disk $I^7$ can act on the free end of an arm $I^{12}$ of a rock-shaft $I^{10}$ on the frame B', which rock-shaft has an upwardly-extending arm $J^6$, which is pivotally connected with a striker $J^7$, passing through a suitable guide-neck $J^8$ in the frame and is surrounded by a helical spring $J^9$, which is compressed when the end of the arm $I^{12}$ rides on the cam $I^8$ and is released when the end of the arm $I^{12}$ slides off the cam $I^8$. In expanding the said spring drives the driver $J^{10}$, mounted loosely on the striker $J^7$, against a basket-bottom $a$, which is held on the smaller end of one of the basket-forms, whereby the pins $E^{10}$ on this smaller end of the form are driven into the basket-bottom, which is thus held in place on the form by the driver $J^{10}$ during the time this form revolves while in raised position.

A collar K, secured on the shaft $D^5$, has a circumferential cam-groove K', in which a roller-pin $K^2$ travels, (see Figs. 2 and 5,) which projects from a lever $K^3$, pivoted at its upper end to a bracket $K^4$ of the machine-frame B', and which lever $K^3$ is provided at its lower end with a roller-pin $K^5$, which extends into a longitudinal slot $K^6$ of an arm $K^7$ on rock-shaft $K^8$, suitably mounted on standards $L^{14}$.

A circular frame L, Fig. 22, having a raised circumferential rim L', has two arms $L^2$, to which the rock-shaft $K^8$ is attached, the shaft being omitted between the arms. The frame L has a hollow hub $L^3$, into which the hollow hub $L^4$ of a disk $L^5$ passes, which disk $L^5$ fits within the frame L, as shown. A headed stud $L^6$ rests loosely in the hub $L^4$ and is surrounded by a helical spring $L^7$, which presses the disk $L^5$ outward and also presses the head of the stud $L^6$ against the edge of a lever $L^8$, pivoted to arms $L^9$ of the frame L and which lever passes through slots $L^{10}$ and $L^{11}$ in the hubs $L^3$ and $L^4$, respectively. A pin $L^{12}$ is passed through the hub $L^4$ at the outer edge of the lever $L^8$. A fixed arm $L^{13}$ of one standard $L^{14}$ is so located that when the frame L is swung into vertical position the lower end of the lever $L^8$ can strike against this arm, whereby the pin $L^6$, hub $L^4$, and disk $L^5$ are pushed outward. This arm carries an eccentrically-mounted roller $L^{18}$, against which the end of the lever $L^8$ can strike. This roller can easily be adjusted according to the desired length of movement of the disk $L^5$.

On the under side of the frame L three sliding jaws N are mounted, the outer ends of which are extended outward at right angles and carry rollers N' and form a clutch. A helical spring $N^2$ is attached to each sliding jaw N and to a corresponding pin on the frame, and these springs serve to pull the jaws inward. One sliding jaw is mounted to slide in the direction of the length of the pusher $J^4$ and the others at right angles thereto, so that when the pusher $J^4$ pushes a basket-bottom $a$ from the bottom of the hopper J upon the frame L, the latter being in horizontal position, this basket-bottom slightly forces the side jaws N apart; but these jaws are immediately returned by their springs $N^2$ against the edge of the basket-bottom $a$ and, in conjunction with the third jaw, (see Fig. 12,) hold the basket-bottom on the frame L while the same is being swung into vertical position. The pusher $J^4$ pushes the basket-bottom forward until it strikes this third jaw N—that is, the jaw N on the left-hand side of frame L in Fig. 12.

A sprocket-wheel M is fixed on the shaft $D^5$ and over the same a sprocket-chain M′ passes, which also passes over the sprocket-wheel $M^2$ on the shaft $M^3$ on the top of the frame B′, over the sprocket-wheel $M^4$ on the shaft $M^5$, and over the idle sprocket-wheel $M^6$, mounted on a pin of the frame B′. (See Fig. 10.) On the shaft $M^5$ two disks O are fixed, which are provided on the rim with a series of equidistant slightly-inclined spurs O′, which are separated a distance slightly greater than the width of a basket-stave, with one exception, however, Fig. 17. Midway between each two spurs O′ a radially-sliding bolt $O^2$ is mounted, which is guided at its outer end in a hole on the rim of the disk and at its inner end in a hole in a lug $O^3$ on the side of the disk. A helical spring $O^4$, surrounding the bolt $O^2$, between the corresponding lug $O^3$ and a shoulder $O^5$ of the bolt, presses the bolt outward radially. A pin $O^6$ is formed on the outer end of each bolt $O^2$. Each bolt $O^2$ has a notch $O^{14}$ for receiving the end of the short arm $O^8$ of an L-shaped lever $O^7$, of which one is pivoted to the inner side of the rim of the disk O adjacent to each bolt $O^2$. The springs $O^4$ press the arms $O^8$ against lugs $O^9$, which lugs limit the outward movement of the bolts, so that only the points $O^6$ project beyond the periphery of the disk, as shown in Fig. 17. The longer arms $O^{10}$ of the levers $O^7$ extend toward the center of the disk and are curved. These curved arms are adapted to strike a cam $O^{11}$, projecting from a bracket $O^{12}$ on the frame B′ when the disks O rotate. The cam $O^{11}$, acting on the arms $O^{10}$, withdraws the bolts, and when a bolt arrives at horizontal position the end of the corresponding arm $O^{10}$ slides off the cam $O^{11}$ and its spring $O^4$ throws the bolt outward, whereby the pin $O^6$ is forced into a stave $b$, which rests on the next following spur O′ below. The staves are thus held on the disks O and carried up by the same, as shown in Fig. 17.

The shaft $M^5$ also carries a wheel P, Fig. 15, having a cam P′ on one side at its rim and a circle of cam projections $P^2$ on the other side. The rim of the wheel P travels between two downwardly-extending pins $P^3$, Fig. 10, on a lever $P^4$, pivoted to swing horizontally at $P^{14}$, the swinging end of this lever being pivoted to a horizontal slide $P^5$, mounted to reciprocate transversely to the length of the machine on a cross-bar $P^7$, Fig. 26. Three pairs of vertical guide-rods $P^6$ extend upward from the cross-bar $P^7$, and three pairs of vertical rods $P^8$ extend upward from a cross-bar $P^9$. The slide $P^5$ is mounted and guided on the cross-bar $P^7$ to slide under the rods $P^6$, as shown in Fig. 26. One rod $P^6$ of each pair has a lateral extension $P^{10}$ at the bottom, which extension forms a recess $P^{11}$ of slightly-greater height than the thickness of an outer hoop-strip $d$, $e$, or $f$. The effective height of the opening of said recess can be regulated by an adjustable plate $P^{12}$ on the inner face of one rod $P^6$. A plate $P^{13}$ is held adjustably in a recess $P^{17}$ in the top of the slide $P^5$ at each pair of rods $P^6$ and forms a shoulder for pushing the bottom hoop-strip into the recess $P^{11}$. A weight $P^{15}$ on each pair of rods $P^6$ rests on the top strip, and when these weights are raised to insert strips they are held by retaining-springs $P^{16}$ on the tops of the rods. The front ends of the hoop-strips abut against the fixed uprights $P^{18}$.

The shaft $M^3$, carrying the sprocket-wheel $M^2$, also carries the sprocket-wheels Q, R, S, T, and V, over which the sprocket-chains Q′ R′ S′ T′ V′ pass, which also pass over the sprocket-wheels $Q^2$ $Q^3$, $R^2$ $R^3$, $S^2$ $S^3$, $T^2$ $T^3$, and $V^2$ $V^3$, respectively. The chains Q′ S′ V′ serve for feeding the outer hoop-strips $d$ $e$ $f$ forward, and the chains R′ and T′ serve for moving the staves $b$ while resting on their flat sides forward. The chains Q′ S′ V′ have spurs or pins $Q^4$, Fig. 16, which impinge into the hoop-strips for moving them lengthwise, and the chains R′ T′ have lugs $R^4$, which engage the edges of the staves and push the staves forward while resting at their ends on the ledges R. The wheels $Q^2$ $Q^3$, $R^2$ $R^3$, $S^2$ $S^3$, $T^2$ $T^3$, and $V^2$ $V^3$ are mounted on three longitudinal bars $S^4$, secured on transverse rods $S^5$ of the machine-frame. A cross-piece 1 extends across the side bars of the frame, Fig. 20, and from the same spring guide-arms 2 project, and above them three spring-arms 3 are arranged, which are attached to the bottom edges of the bars $S^4$. Each side piece of the main frame has a ledge 4 at the bottom edge of the top piece on the inner side, and on them the end parts of the staves $b$ rest while being advanced to the uppermost form by the chains R′ T′. A plate 5 is secured to the under edges of the bars $S^4$, and the bottom parts of the chains V′ pass under it, the lugs $R^4$ extending downward, so that they can impinge on the edges of the staves $b$ and push them forward. The spring-arms 3 and 2 hold the outermost stave while the form is changing position and also guide the staves to proper place and hold them until they are stapled. The shaft $M^3$ also carries a printing-pad $S^6$ on the end of a crank-arm $S^7$ for printing marks or names on certain staves, as shown in Fig. 11 at $x\ z$, and as this crank-arm $S^7$ and pad rotate with the shaft the printing-pad wipes over an inking-roll $S^8$ on an arm of one transverse rod $S^5$, Fig. 14.

When the slide $P^5$ moves toward the right, Fig. 26, the shoulders of the same engage each the edge of the lowest hoop-strips $d\ e$ in the two piles of hoop-strips $d$ and $e$ and push the same laterally into the corresponding recesses $P^{11}$ and under the chains $Q'\ S'$, and the pins or spurs $Q^4$ of these chains dig into these strips and move them forward, the strips resting on the staves $b$. By these lateral movements the strips have cleared the uprights $P^{18}$ and have been moved to one side of the same. During the return movement of the slide $P^5$ a strip $f$ is taken from the bottom of the pile of strips $f$ in the same manner. The strip $d$ forms the top outer hoop, the strip $e$ the intermediate outer hoop, and the strip $f$ the bottom outer hoop, of the basket. When the plates $P^{13}$, forming the shoulders, are moved out of the recesses $P^{11}$ into their original positions, as shown in Fig. 26, all the strips in each pile drop the distance of the thickness of one strip, and so on.

A short shaft U, mounted on a bracket of the machine-frame, carries a ratchet-wheel $U'$, the teeth of which are engaged by a pawl $U^2$ on the short arm of an L-shaped lever $U^3$, the longer arm of which is pressed by a spring $U^{18}$ against the rollers $P^2$ on the side of the wheel P, so that every time a roller trips the lever $U^3$ the ratchet-wheel $U'$ is turned the distance of one or more teeth. A hand-wheel $U^4$ on the end of the shaft U also permits of turning it by hand. A sprocket-wheel $U^5$, Fig. 7, is fixed on the shaft U, and over the same a sprocket-chain $U^6$ passes, which also passes under the sprocket-wheel $U^7$, fixed on a shaft $U^8$, mounted in a bracket of the machine-frame and over the idle sprocket-wheel $U^9$ on a standard $U^{10}$ of the machine-frame.

A cog-wheel W on the shaft U engages a cog-wheel $W'$ on a transverse shaft $W^2$, carrying at its center the sprocket-wheel $W^3$, on each side of which a rearwardly-extending arm $W^4$ is mounted loosely on said shaft. A sprocket-wheel $W^5$ is mounted in the outer ends of the arms $W^4$, and over the same and the sprocket-wheel $W^3$ a sprocket-chain $W^6$ passes. A sprocket-wheel $W^7$ is fixed on the end of the shaft $W^2$ and engages a sprocket-chain $W^8$, passed over the sprocket-wheel $W^9$ on a pin on the standard $W^{10}$ on the machine-frame and over a sprocket-wheel $W^{11}$ on the outer end of a short shaft $W^{12}$.

Sprocket-wheels $Y'$ and $Y^2$ are fixed on the inner ends of the shafts $U^8$ and $W^{12}$, and over them the sprocket-chains $Y^3$ pass, which are also passed around sprocket-wheels $Y^4$ at the extreme rear ends of the frame $B'$, one at each side and below the staves $b$, which rest on edge on the flanged horizontal guides $Y^5$, on which said staves can be pushed forward while on edge.

The strips $g$ for the inner top hoop of the basket are placed one upon the other flat in a vertical box or receptacle $m$, suitably supported on two cross-pieces $m'$ of the frame. These strips are pressed down by a weight $m^2$ resting on the uppermost strip, and this weight is attached to cords $m^3$, passing over pulleys $m^4$ in the top of the box or receptacle $m$. In the grooved top of each cross-bar $m'$ a slide $m^5$ is mounted, Figs. 15 and 28, to move lengthwise of the cross-bar, and each slide has a downwardly-extending arm $m^6$, carrying a roller which runs in the eccentric cam-groove $m^7$ of an arm $m^8$, said two arms $m^8$ extending from a rock-shaft $m^9$, carrying at one end a cog-segment $n$, engaging a like cog-segment $n'$ on the rear end of the rock-shaft $K^8$. (See Figs. 12 and 15.) Each slide $m^5$ is provided at one end with a lug $n^2$, having its outer edge beveled, and adjacent to said lug a recess $n^3$ is found in the top edge of the slide of a size about equal to about twice the width of a strip $g$. A flat spring $o$ is secured vertically at its upper end to the outer side of the receptacle $m$ near its front end and is provided with a longitudinal slot $o'$ in its lower part. A latch $o^2$ is pivoted at its inner end in a recess $o^3$ in the outer side of the receptacle $m$ in such manner that it can swing up and down, the front end of said latch terminating in a rectangular arm $o^4$, Figs. 25 and 29. A hook-lug $o^5$, beveled on its under side, projects from the latch $o^2$ and can pass through the slot $o'$ in the spring-strip $o$.

As shown in Fig. 28, the slides in moving to the left and pushing a strip $g$ in like direction bring the projecting end of this strip in the path of the lug $G^5$ of the bottom form, which lug in rising with the rotating form raises the end of the strip and causes it to strike on the arm $o^4$ of the latch $o^2$ from the under side, whereby the said latch is raised, and then the hook-lug $o^5$ is raised above the bottom of the slot $o'$ in the spring $o$, the said spring is released, and its spring tension throws its lower end outward and causes it to strike the front end of the strip $g$ and to throw it into the recess $G^3$ in the flange $E^3$ of the disk $E^2$ of the bottom form. When the slides $m^5$ move back—i. e., to the right, Fig. 28—the lug $n^2$ forces the lower end of the spring $o$ back against the side of the receptacle $m$ and the hook-lug $o^5$ of the latch $o^2$ locks it in place automatically. The lowest strip $g$ in the receptacle $m$ now drops into the recess $n^3$ and is pushed laterally by the slide at the next strike to the left, Fig. 28, and so on.

The front ends of the hoop-strips $g$ in the receptacle $m$ abut against a vertical strip $m^{10}$, held at the front end of the receptacle $m$.

Adjacent to the disks O and directly above the staves $b$ across bar $n^{10}$, Fig. 23, is fixed in the machine-frame, and in transverse dovetailed grooves $n^{11}$ in the under side of the same two angle-pieces $n^2$ are mounted, and through the upwardly-extending arm of each angle-piece a screw-bolt $n^3$ projects from the bar $n^{10}$. Nuts $n^4$ and $n^5$ are screwed on said bolt at opposite sides of arms of the said angle-pieces $n^2$, so that by adjusting said nuts on the bolts the angle-pieces can be shifted transversely to the bar to suit the thickness of staves used and prevent but one being separated at a time. To the under side of each angle-piece a retaining-clip $n^6$ is pivoted, which is provided at its free end with a sharp bottom corner $n^7$ and with an upwardly-extending arm resting against a set-screw $n^8$ in a lug $n^9$ on the bar $n^{10}$. By means of this screw the clip $n^6$ can be readjusted to hold that stave next to the one resting against the disks O in true vertical position without interfering with its being pushed against the disks O by the succeeding staves at the proper time.

A pawl $o^{10}$ is pivoted to the frame B' and prevents return movement of the form-carrier, Fig. 14. To give the walls of the basket the desired concavity, as shown in Fig. 37, a roller $o^{12}$, which presses on or near the central hoop-strip of the basket being made, is mounted on an arm $o^{13}$, pivoted to the frame B' at $o^{14}$ and acted on by a spring which produces the desired pressure. On the shaft B$^4$ three rocking frames $p$ are mounted by means of their bottom pieces. (See Figs. 2 and 10.) At each frame $p$ cog-wheel $p^{12}$ is fixed on the shaft B$^4$ and engages a cog-wheel $p'$, mounted in the swinging ends of the bottom piece of the frame and united at each side with a cam-disk $p^2$ and $p^3$, Fig. 5, of which the former serves for operating a staple forming and driving mechanism $p^4$ of any approved construction. The disk $p^3$ has a recess $p^5$ in its rim for receiving part of the rim of a disk $p^6$, on which the disk $p^3$ runs edgewise, and said disk $p^6$ is mounted in bearings which are adjustable slots $p^7$ of arms $p^8$, Fig. 1, on the frame B'.

As the disks $p^3$ rotate on the rims of the disks $p^6$ and the recess $p^5$ arrives at the bottoms the disks $p^3$ and the frame $p$, carrying the stapling mechanism, drop and adjust themselves sufficiently to permit the staplers to rest on the basket being formed at any height that the thickness of the material may be, and when the staplers are so lowered the previously-formed staples are driven. As the disks $p^3$ continue to rotate the stapler-frames are immediately raised, so that the staplers will be out of the way of material fed on the forms. The time that the staplers are to drop can readily be determined by shifting the axis of the disks $p^6$ a greater or less distance from a vertical line extending downward from the axes of the disks $p^3$, for the nearer the axes of the disks $p^6$ are to these vertical lines the quicker will be the drop.

$p^{10}$ represents the reels for the wire from which the staples are made.

$l$ is a hand-wheel on the end of the shaft B$^4$ for turning said shaft to adjust the staplers in proper position or to work them by hand in case necessity should require this.

$v$, Fig. 14, represents curved guides for the ends of the staves while the same are being raised by the disks O from vertical to horizontal position.

A sprocket-wheel $r$, Fig. 33, is secured on the shaft A, and over the same a sprocket-chain $r'$ passes, which also passes over a sprocket-wheel $r^2$ on a shaft $r^3$, mounted in a suitable standard $r^4$ on the bottom of the front part of the machine-frame B'. A frame $r^5$ extends upward at an inclination from the shaft $r^3$ and is braced by braces $r^6$ or otherwise suitably supported. (See Fig. 33.) A sprocket-wheel $r^7$ is mounted between two arms $r^8$, projecting from the upper end of the said frame $r^5$, and over this sprocket-wheel $r^7$ and a second sprocket-wheel on the shaft $r^3$ a sprocket-chain $r^9$ passes, from which lugs $r^{10}$ project at regular intervals. To the arms $r^8$ a substantially U-shaped frame $s$ is pivoted near one end of the same, and from the lower corners of said frame curved side pieces $s^2$ extend to the upper ends of the side pieces of said frame. A ratchet-wheel $s^3$ is fixed on one end of the shaft of the sprocket-wheel $r^7$, and a pawl $s^4$, having a laterally-projecting pin $s^5$, is pivoted to the frame $s$. The pin $s^5$ extends into a segment cam-slot $s^6$ in a plate $s^7$, formed on a fixed arm $r^{18}$ at one side of the frame $r^5$, and in this slot a track-piece $s^8$ is held, which is provided at its upper end with a cam projection $s^9$.

Guide-rails $t$, parallel with the frame $r^5$, are secured to side arms $t'$ on said frame, and to the upper ends of said guide-rails a projecting circular guard $t^2$ is attached, from which rods $t^3$ extend downward. Spring guide-strips $t^4$ extend from the rails to the guard $t^2$.

When a completed basket $h$ is knocked off the bottom form, it drops upon the frame $r^5$ bottom foremost, and at its open end it is engaged by one of the lugs $r^{10}$ of the sprocket-chain $r^9$ and moved upward along the frame $r^5$, the tilting frame $s$ being in the position shown in Fig. 36. The bottom of the basket engages the bottom of the frame $s$, which is in the position shown in Fig. 36, and begins to press the bottom of the frame downward. This brings the pin $s^5$ from the position shown in dotted lines in Fig. 35 to the inner edge of the cam-slot $s^6$, and thereby the pawl $s^4$ is engaged with the teeth of the ratchet-wheel $s^3$, which now forcibly swings the frame $s$ into the position in Fig. 33. The open end of the basket is pressed against the spring-strips $t^4$, which are strained more or less, and when the frame $s$ arrives in the position shown in Fig. 33 assist in throwing off the basket, which drops through the frame or guard $t^2$ and is guided in its vertical descent by said frame or guard and the rods $t^3$. The basket drops bottom downward upon a suitable support $h'$ or into a basket $h$, previously dropped upon said support, and thus the baskets are stacked automatically. When the pawl arrives at the bottom of the cam-slot $s^6$, it is lifted out of engagement with the ratchet-wheel $s^3$ by the action of a cam edge $s^{10}$ on the pin $s^5$, and this pin is thrown out so far that when the pawl rises with the upwardly-swinging lower end of the frame $s$ the pin $s^5$ travels on the outer edge of the track $s^8$, and thus holds the pawl clear of the ratchet-wheel, while the frame $s$ is swinging under the action of its heavier upper part from the position shown in Fig. 33 into the position shown in Fig. 36. The curved arms $s^{11}$, projecting from the arms $r^8$, serve to force the basket away from the frame $s$ while the same is swinging into the position shown in Fig. 3.

The operation of the machine is as follows: The staves $t$ are placed on the edge of the ledges $Y^5$, Fig. 14, and the arms $W^4$ lowered, so that the chain $W^6$ can act on the upper edges of staves, the chain $Y^3$ acting on the bottom edges of the staves to advance them to the left, Fig. 14. Thereby the front stave is always pressed against the disks O, which, as will be observed in Fig. 17, have a blank space which is not provided with a spur $O'$ or a bolt $O^2$, and these disks must be so set that the first left-hand stave rest directly above the spurs $O'$, succeeding the blank space in the direction of rotation. The outer hoop-strips $d\ e\ f$ are placed between the pairs of uprights $P^6\ P^8$, the ends resting against the standards $P^{18}$. The inner hoop-strips $g$ are placed into the magazine $m$, the weight $m^2$ having been raised by means of the chains or cords $m^3$. A quantity of basket-bottoms $a$ is placed into the basket-bottom hopper J. The staplers $p^4$ are threaded with wire and adjusted, and all parts of the machine are properly adjusted and timed. A spring-pressed bolt $O^2$ in each disk O, Fig. 17, which bolts have been withdrawn by the action of the cam $O^{11}$, is now released by said cam and is thrown outward by its spring, and the pin $O^6$ is forced into the first stave, and the stave is carried up. By the time this end stave has been raised clear of the rest all the feeding mechanism comes to rest and is locked from movement for an instant on account of the straight thread part $A^7$ of the worm $A^6$, as and for a purpose that will be described more fully hereinafter. Before this, however, and at the same time that the disks O raise the first stave the lever $U^3$, Fig. 15, has been raised by a roller $P^2$ on the cam-disk P and the pawl $U^2$ on this lever has engaged a tooth of the ratchet-wheel $U'$. As the end of the lever $U^3$ slides off the roller $P^2$ the spring $U^{18}$, Fig. 14, throws the said lever down suddenly, causing the pawl $U^2$ to give the ratchet-wheel $U'$ a quick short turn the distance of one or more teeth, and this gives a quick short movement to the chain $Y^3$, on which the staves rest, causing them to deliver the staves to the disks O, the spring $U^{18}$ applying the proper tension. In this manner the staves are successively fed to and raised by the disks O and then transported by the chains $R'\ T'$, having lugs $R^4$, which press the staves forward while resting on the ledges 4 and supported by the spring-arms 2 and 3, Fig. 20. It is of course clear that no stave is fed once for each rotation of the disks O on account of the blank space of the disks above mentioned, so as to obtain the lap of the outer hoops and for securing the lap of the hoop. When the first stave is being raised, the outer hoop-strips $d\ e\ f$ are shifted from the bottom of their piles into the paths of the chains $Q'\ S'\ V'$, having the pins $Q^4$, which are forced into the strips and move them lengthwise in the manner already described, and thus these strips are moved toward the raised basket-form. During this time the lowest bottom is being pushed by the slide $J^4$ upon the tilting frame L, upon which it is forced between the yielding spring-jaws $N'$ of the clutch already described. The frame L now begins to tilt, and at the same time the lowest inner hoop-strip $g$ in the magazine $m$ is forced out in the manner previously described. When the bottom has been tilted to nearly a vertical position, it is forced from between the spring-jaws $N'$ by the coaction of the lever $L^8$ and roller $L^{18}$ in the manner described against the smaller end of that basket-form which at that time is in the lower rear position, the pins $E^{10}$ entering the basket-bottom and the pin $F^9$ passing through the central hole $a'$ in the basket-bottom for the purpose of properly centering the latter on the form. The end of the inner hoop-strip $g$ is engaged with the lower rear form and partly wound on the same and is held on the form by the free end of the corresponding arm G. The form-carrier and forms now begin to change their positions as follows: The roller $H^{13}$ on the lever $C^3$ has dropped into the cam-recess $H^{15}$, and thereby the clutch-sleeves $C'\ C^2$ have been engaged, and thus the wheels $D^2$ and $D^3$ are rotated; but at the same instant and by the lever $C^3$ the cushion-stop $C^{12}$ has been moved outward and out of the path of the stop-lugs $F^{12}$ of the form-carrier, thus leaving the latter free to turn. When the form-carrier has moved a short distance, the spring-pawl $H^9$, Fig. 14, strikes the pin $H^{18}$, and thus this pawl is disengaged from the toothed wheel $H^8$ on the sleeve $C^4$. At the same time the pawl I, carried by the form-carrier, engages a tooth of the ratchet-wheel I' on the side of the cog-wheel $E^5$, Fig. 5, locking the three cog-wheels $E^4$ on the form-carrier to the cog-wheel $E^5$, so that the three wheels $E^4$ will not roll on the wheel $E^5$, but with the same will turn around the shaft $D^5$. The rotation of the shaft $D^5$ in the direction of the arrow $x'$, Fig. 14, and the rotation of the form-carrier in the direction of the arrow $x^2$ causes the pawl $H^9$ to slip off the pin $H^{18}$ and to overtake the wheel $H^8$ and engage a fresh tooth, whereby the sleeve $C^4$ and the cog-wheel $E^5$ are again rotated in the direction of the arrow $x'$ in Fig. 14. Clutches C' and $C^2$ are then disengaged, and the cushion-stop $C^{12}$ is brought back in the path of the lugs $F^{12}$, one of which strikes said stop and stops the form-carrier. The pawl $o^{10}$ drops in a notch in the form-carrier and prevents return movement. The form with the previously-applied bottom and inner hoop $g$ has now reached the top position and can receive the staves and outer hoops. The spring-pressed bottom-driver $J^{10}$ is now released by the cam $I^8$ and drives the bottom against the arms $E^9$ of the form. At the instant the bottom-driver $J^{10}$ strikes the bottom the staple formers and drivers are lowered upon the hoops and staves, driving the staples through the hoops and staves and clenching them upon the form. When the staple former and driver rises, the elasticity of the hoops causes them to spring out again after having been compressed on the flattened surface on the form. Thereby the clenched inner ends of the staples are raised out of the clenching holes or grooves, so as not to interfere with the knocking of the completed basket from the form, as appears clearly from Figs. 8 and 9. The spring-arm G, which has been resting and guiding the inner hoop, now comes in contact with the cam $G^2$ on the form, whereby said arm G is raised from the inner hoop and allows the upper ends of the staves and upper outer hoop to pass under it, and then this arm slides off the cam $G^2$ upon the outer hoop. The staves and hoops are fed and applied and secured to each other in the manner described. As the blank space on the disks O which comes after the last stave of each basket does not feed a stave and as all other parts continue to operate, the laps of the hoops are stapled—that is, when all the staves have been applied on the form the basket is practically complete—but the free ends of the hoops are not secured. Therefore the staplers descend again and drive staples through such hoop ends and through the stave first applied and stapled. The first basket is now completed on the top form and the inner hoop and bottom of the second basket have been applied on the bottom form. During the nailing of the laps of the hoops on the completed basket the spring-pressed driver $J^{10}$ is withdrawn from the bottom by the cam $I^8$, freeing the bottom of the completed basket. The form with the previously-applied bottom and inner hoop $g$ is now moved to the upper position to receive the staves and outer hoops. Immediately thereafter the clutch members C' $C^2$ are disengaged, and the cushion-stop $C^{12}$ is brought back into the path of the lugs $F^{12}$, one of which strikes said stop, and thus stops the form-carrier. The pawl $o^{10}$ drops into a notch in the form-carrier and prevents return movement. The carrier is now rotated in the manner described and brings the top form to the front and the rear form to the top. While this takes place the roller F' in the projecting end of the rod F rides on the fixed cam $F^{11}$ and compresses the spring $F^2$ and causes the end disk $F^{10}$ to force the basket off the form, the free end of the spring-arm G having in the meantime been lifted off the outer top rim of the completed basket by the cam $G^2$. When the roller F' slides off the cam $F^{11}$, the spring $F^2$ brings the disk $F^{10}$ back to normal position in the form. The completed ejected basket drops upon the chain $r^9$ and is lifted and then stacked in the manner described. The operation has now been explained with the exception of how the forms change position. As soon as the inner hoop is taken up and held by the bottom rear form the form-carrier begins to turn to change the positions of the forms—that is, the rear form rises to the top and the top form descends to the bottom and front. As the rear form turns axially while being raised into top position, the inner hoop is partially or entirely wound upon the form, this depending upon where the inner hoop is taken up. In the machine as shown the inner hoop is wound half-way round. To complete an eleven-stave basket, the form turns upon its axis eleven successive steps after the first stave is applied. At each of the first ten steps a stave is applied and the hoops are stapled to it. The eleventh step brings the first stave again under the staplers, and the rear ends of the hoops, which lap over said staves, are stapled, thus finishing the basket. The forms are then shifted to the succeeding stations, the rear form being brought into position to receive the first stave for the next basket and the hoops being fed as heretofore described. The change of position of the forms from one station to the next is effected in slightly less than the time required to apply and staple a single stave. Thus the machine is in operation practically continuously, a basket having eleven staves being completed for each twelve turns of the worm-shaft.

The timing of the forms, the form-carrier, and the basket-feeding devices in the particular machine described and illustrated is as follows: The form-carrier moves one-third of a revolution, bringing the lower rear form to the upper station. The stave-feeding devices are so timed that the first stave and the outer hoops are applied to the form immediately on its arrival at the upper station. At this instant the "dwell" or non-active portion of the worm-thread becomes effective and holds the form from rotation and the feeding mechanisms inactive while the staples are driven. The succeeding eleven turns of the worm feed the form forward eleven steps, during which ten additional staves are applied and the hoops stapled to them. The last step or movement brings the form to its initial position with the first stave under the stapling mechanism and the rear ends of the hoops lapped over their forward ends. During the moment the form stops in this position the final staples are driven, fastening the laps of the hoops down and completing the basket. While the movement is taking place which brings the laps to the stapling mechanism no stave is fed forward, owing to the blanks or non-feeding spaces in the stave-feeding wheels O. During the turn of the worm-shaft A which succeeds the driving of the last staples the clutch $C^3$ is thrown into action by the cam $H^{15}$ of the wheel $H^5$ and the form-carrier is moved forward one-third of a revolution, bringing the form with the complete basket to the front station and moving an empty form from the rear station to the upper station. In this manner the forms are moved successively to the upper, front, and rear stations. In the machine illustrated the worm-gear has twelve teeth, the ratchet or notched wheel $H^8$ has nine notches, and the circumference of the gear $E^5$ is to that of the gear $E^4$ as twelve to eleven. At each station each form rotates through three hundred and sixty degrees, being always in gear with the common gear $E^5$. In addition to this each form is rotated through one and one-eleventh turns, due to its bodily or orbital movement about the shaft $D^5$. Furthermore, as the worm $A^6$ makes one complete revolution, giving the gear-wheel $E^5$ one-twelfth of a revolution each time the forms are shifted from station to station the forms rotate an additional one-eleventh turn between each two stations, and thus gain three-elevenths in traveling the circle from the upper station back to said station. The sum of all of these rotations which a form makes on its own axis from the beginning of one basket until the beginning of the next basket would thus be four and four-elevenths turns, provided no compensating or retrograde movement took place. In order that the first stave may be applied always at the same point on each form to preserve the proper relation between the first stave and the ends of the inside hoop, I provide for a loss of four-elevenths of a turn in each revolution of each form about the shaft $D^5$. This is the function of the pawl $H^9$ and the arm $H^{16}$. The pawl comes in contact with the arm once in each rotation of the shaft $D^5$, whereby the pawl is lifted out of engagement with a notch in the wheel $H^8$ and moves forward into engagement with the succeeding notch. As there are nine of these notches, one-ninth of a rotation of the gear $E^5$ is lost each time the forms move from one station to the next and three-ninths or one-third of a rotation of $E^5$ is lost during a complete rotation of the carrier. One-third or four-twelfths of a rotation of $E^5$ effects four-elevenths of a rotation of each of the form-carriers, which subtracted from four and four-elevenths turns leaves four complete turns. It thus appears that the net rotary movement of each form for each rotation of the carrier is just four turns. Hence the same point on each carrier will always receive the first stave.

While I have described a machine in which the movements of the carrier and the forms are timed as above, it will be evident that the principles of my invention are applicable to machines having different arrangements and different timings of the gearing. It is only necessary to present the same part of the form for the application of the first stave when a certain other part is always made to receive the end of the inner hoop. If, for instance, additional devices were provided for receiving the inner hoop at additional points on the form, it would be possible to apply the first staves at different points, it being only necessary or desirable to avoid lapping the inner and outer hoops at the same part of the periphery of the basket. The gearing described I have found very convenient in making eleven-stave baskets; but it will be understood that my invention is not limited to the manufacture of baskets of any particular number of staves and that the skilled mechanic will be able to adapt it to the manufacture of baskets of different forms, sizes, and proportions, as desired.

Having described my invention, what I claim as new, and desire to secure by Letters Patent, is—

1. A basket-making machine having a movable form-carrier, basket-forms on the same, means for rotating the forms intermittently on their own axes, means for automatically applying bottoms, hoops and staves on the forms successively at different positions of the forms, a staple-driving mechanism for driving staples through the hoops and staves on the forms, and means for automatically operating the said mechanism to drive staples.

2. In a machine for making baskets, the combination with a movable form-carrier, of rotary basket-forms mounted on a shaft, of rotary basket-forms on said carrier, a cog-wheel on each form, a cog-wheel on a shaft engaging the cog-wheels on the forms, the cog-wheel on the shaft having more teeth than the cog-wheels on the forms, means for rotating the said cog-wheels, means for applying staves, hoops and a basket-bottom to a form and for applying securing devices to the material on the form and completing a basket while the cog-wheel on the shaft is making a turn.

3. In a basket-making machine, the combination with a plurality of basket-forms, of an interrupted worm, means for rotating the worm, means for feeding basket material to the basket-forms, and means for operating parts of the machine from said worm whereby an intermittent motion is given to parts of the machine and means for feeding the basket elements, substantially as herein shown and described.

4. A basket-making machine having a rotary form-carrier and gearing for rotating the same, of means for automatically locking the carrier in place after a partial rotation, rotary forms on the carrier, means for automatically unlocking the carrier, means for applying staves, hoops and basket-bottoms on said forms, means for imparting such relative intermittent rotary motion to the forms as to wind the hoops more than a complete circumference of the form, and means for securing together the same on the forms during the intermittent movements of the forms, substantially as herein shown and described.

5. In a basket-making machine, the combination with a form-carrier, of a shaft for the same, forms on the said carrier, which forms have a central pin and retaining-pins on one end, a hopper for basket-bottoms, means for successively removing the bottoms from said hopper, a tilting plate for receiving, holding and tilting up the bottoms and a cam on the carrier-shaft for operating said tilting plate and pushing the bottoms against the retaining-pins on the forms, substantially as herein shown and described.

6. In a basket-making machine, the combination with a form-carrier, forms on the same, of chains for conveying staves and hoop-strips to the forms, grippers on said chains for gripping the hoop-strips, receptacles for the hoop-strips and a slide for shifting the ends of the hoop-strips laterally into the paths of the grippers on the chains, substantially as herein shown and described.

7. In a basket-making machine, the combination with a form-carrier and forms on the same, of means for automatically applying hoops, staves and basket-bottoms on said forms, means for rotating the forms with regular interruptions, staple forming and driving mechanisms and means for automatically lowering the said staple forming and driving mechanisms upon the form at least once during the interruption of the rotary movement of the form, substantially as herein shown and described.

8. In a basket-making machine, the combination with a form-carrier, of rotary forms on the same, which forms are provided at their ends with a flange having cam projections, a plurality of spring-arms attached to the carrier and resting on the flanges of the forms and on the hoops when the hoops are applied on the forms, substantially as herein shown and described.

9. In a machine for making baskets, the combination with a movable form-carrier, of a plurality of rotary forms on the carrier, means for rotating the forms on their axes and means for automatically locking the form-carrier against movement while the forms on the carrier are being rotated on their axes, and yielding means for checking the movement of the carrier as it approaches a position of rest, substantially as herein shown and described.

10. In a machine for making baskets, the combination with a rotary form-carrier, of means for moving the same, a plurality of rotary forms on the form-carrier, means for rotating the forms on their axes, a stop for automatically stopping the form-carrier and means for checking the movement of the form-carrier automatically before it is stopped by the above-mentioned stop, substantially as herein shown and described.

11. In a machine for making baskets, the combination with a rotary form-carrier, of means for rotating the same, a plurality of rotary basket-forms on the carrier, means for rotating the forms, a stop for automatically stopping the form-carrier, means for automatically applying said stop, a brake-band on the form-carrier and means for automatically applying said brake-band before the form-carrier is stopped by the above-mentioned stop, substantially as herein shown and described.

12. In a machine for making baskets, the combination with a movable form-carrier, of forms on the same, means for assembling staves, hoops and bottoms on the forms, a basket-ejector on each form, a cam, and means for moving the basket-ejectors across said cam, substantially as herein shown and described.

13. In a machine for making baskets, the combination with a movable form-carrier, of forms on the same, means for assembling staves, hoops and bottoms on the forms, means for automatically removing the baskets from the forms, and means for automatically bunching the baskets as they are removed.

14. In a machine for making baskets, the combination with a form-carrier, a frame, a stopping and retaining means on the frame, a plurality of rotating basket-forms on the carrier, a plurality of stop mechanisms on the form-carrier, means for moving the form-carrier automatically so that the stops will come in the path and coact with the stopping and retaining means secured to the frame, and means for supplying different elements in the formation of the basket at different places in the path of travel of the forms to each form successively and during the time that the carrier is stopped, substantially as herein shown and described.

15. In a machine for making baskets, the combination with movable form-carrier, of gearing for moving the same, a plurality of rotary basket-forms on the carrier, means for rotating the forms, a stop for automatically stopping the form-carrier, means for automatically applying said stop, a brake-band on the form-carrier, means for automatically applying and releasing the brake-band when the form-carrier approaches and after it comes to the position of rest, substantially as herein shown and described.

16. In a basket-making machine, the combination with a plurality of basket-forms mounted to be moved to successive positions and means for moving the basket-forms into such positions, means for rotating the basket-forms intermittently, means for automatically applying different basket elements to the forms at the different positions thereof in succession and means for applying securing devices to such basket material, substantially as herein shown and described.

17. In a machine for making baskets, the combination with a rotary form-carrier, of means for automatically rotating the same, a plurality of rotary forms on said carrier and means for automatically locking said form-carrier against movement, and yielding means for checking the movement of the carrier as it approaches a position of rest, substantially as herein shown and described.

18. In a machine for making baskets, the combination with a movable form-carrier, of means for moving the same automatically, rotary forms mounted on the carrier, means for rotating them axially automatically, means for automatically supplying basket material to the forms, means for automatically applying and clenching securing devices on the basket material on the forms, a main driving-shaft, a worm on the same, a worm-wheel driven by said worm, gearing for operating all the basket-material-feeding mechanism and the forms from said worm-wheel, means for operating all of the mechanisms and gearing from the main shaft, without the interposition of the worm-wheel, said worm having a part of each thread at right angles to the longitudinal axis of the main shaft, substantially as herein shown and described.

19. In a machine for making baskets, the combination with a form-carrier and means for moving the same automatically, of a plurality of forms on the form-carrier and means for rotating the same automatically, a receptacle for basket-bottoms, a receptacle for inner hoop-strips, receptacles for staves, receptacles for outer hoop-strips, and devices for securing together basket material on a form, means for applying a basket-bottom and the end of an inner hoop-strip on a form, and means for applying staves on the form at a later period and feeding outer hoop-strips and applying securing devices upon the staves while the staves are being applied on the form, substantially as herein shown and described.

20. In a machine for making baskets, the combination with a form-carrier, of a plurality of basket-forms on the same, each form having bottom supporting and retaining means at one end, a swinging basket-bottom support, means for swinging said support from horizontal to vertical position, means for forcing the bottoms from said support against the supporting and retaining means on the end of a basket-form, when the support is in vertical position and means for automatically moving the form-carrier and stopping the same every time the basket-form is opposite the swinging bottom-support, substantially as herein shown and described.

21. In a basket-making machine, the combination with a form-carrier, of a plurality of rotated basket-forms on the same, each form having bottom supporting and retaining means at one end, a receptacle for bottoms, means for removing the bottoms from the receptacle, means for applying the bottoms to the supporting and retaining means in a vertical position, and means for rotating the bottoms with the forms, substantially as herein shown and described.

22. In a machine for making baskets, the combination with a movable form-carrier, of a plurality of basket-forms on the same, each form provided at one end with means and with a guide for guiding a basket-bottom to said means, a swinging basket-bottom support, means for swinging said basket-bottom support from horizontal to vertical position, means for forcing the bottom from said support against the means when the support is in vertical position, the carrier being mounted to bring the forms successively opposite the swinging bottom-support, and means for stopping the form-carrier when a form is opposite said swinging bottom-support, substantially as herein shown and described.

23. In a machine for making baskets, the combination with a form-carrier, of a plurality of forms on the same, means for applying basket-bottoms on the forms, an automatic driver for forcing the bottoms on the forms, means for rotating the forms in the path of this driver, and means for assembling staves and hoops on the forms after the bottoms have been applied thereto.

24. In a machine for making baskets, the combination with a rotating form-carrier, of rotating basket-forms on the same, means for applying basket-bottoms on the forms while they are in one position, and an automatic driver for forcing the bottoms against the ends of the forms while they are in a second position and gearing for rotating the form-carrier, and holding the same fixed when one of the forms is opposite the bottom-driver, substantially as herein shown and described.

25. The combination with a rotary form-carrier, of a plurality of rotary basket-forms on the carrier and means for automatically rotating the forms axially, means for applying a basket-bottom and an inner hoop-strip to the forms, and means for applying staves and outer hoop-strips on the forms, and means for moving the form-carrier automatically so as to bring the forms after they have received the bottom and inner hoop-strips into the path of the devices for feeding the staves and outer hoops, substantially as herein shown and described.

26. In a machine for making baskets, the combination with a movable carrier, a plurality of forms on the same, means for applying basket-bottoms and inner hoop-strips on one form, means for applying staves and outer hoop-strips and securing devices on another form and means for ejecting a complete basket from the third form all during the intervals between the beginning of the movement of the form-carrier from one position of rest to the beginning of the next movement of the form-carrier from a position of rest, substantially as herein shown and described.

27. In a machine for making baskets, the combination with a movable form-carrier, of a plurality of forms on the same, ledges for supporting staves in flat position, means for moving the staves on said ledges transversely to the length of the staves, and spring-guides between which the staves pass, which spring-guides hold the first stave while the forms are changing position, substantially as herein shown and described.

28. In a machine for making baskets, the combination with a rotary form-carrier, a gear-wheel on the same, of a plurality of shafts, a plurality of stops on the carrier, a cog-wheel mounted on each shaft, a form mounted on each shaft and means for rotating them with the cog-wheel of the shaft, a basket-ejector to each form and a cog-wheel engaging the cog-wheels on the several forms and itself mounted concentric with the form-carrier and means for rotating said cog-wheel, substantially as herein shown and described.

29. In a machine for making baskets, the combination with a movable form-carrier, of a plurality of rotary forms on the carrier, means for rotating the forms axially, means for automatically locking the form-carrier against movement while the forms on the carrier are being rotated axially, and means for automatically unlocking the form-carrier at proper time, substantially as herein shown and described.

30. In a machine for making baskets, the combination with a form-carrier and a plurality of intermittently-rotated basket-forms on the same, of means for automatically feeding and applying basket material on the forms, means for automatically and intermittently locking said feeding mechanism at rest during the interval in the rotation of the forms, and means for automatically unlocking said feeding mechanism, substantially as herein shown and described.

31. In a machine for making baskets, the combination with a form-carrier, of rotary forms on the same, means for rotating the form-carrier, means for rotating the forms, means for feeding staves and securing devices to a form, and means for holding the first stave fed to a form in place, while the forms are changing position caused by the rotary movement of the form-carrier, substantially as herein shown and described.

32. In a machine for making baskets, the combination with a form-carrier, and a plurality of intermittently-rotated forms on the same, of means for automatically feeding and applying basket material on the forms and means for automatically and intermittently locking said feeding mechanisms at rest, during the interval in the rotation of the forms, substantially as herein shown and described.

33. In a machine for making baskets, the combination with a rotary form, of a stave-receptacle, chains for feeding the stave forward toward the form, gearing for moving the chains, a spring trip-lever for actuating said gearing and means for tripping said lever, substantially as herein shown and described.

34. In a machine for making baskets, the combination with a rotary form, of a stave-receptacle, means for feeding the staves forward toward the form, gearing for operating said feeding means, a spring trip-lever for actuating said gearing and means for tripping said lever, substantially as herein shown and described.

35. In a basket-making machine, the combination with a basket-form, of a stave-receptacle, means for feeding the staves forward, rotating disks against which the staves are pressed by said means, which disks have devices on the rims for engaging the staves, and means for conveying the staves from said disk to the form, substantially as herein shown and described.

36. In a basket-making machine, the combination with a basket-form, of a stave-receptacle in which the staves are held on edge, chains for feeding the staves forward, rotating disks against which the staves are pressed by the chains, which disks have devices on the rims for engaging the staves and giving them a quarter-turn and chains for conveying the staves to the form, substantially as herein shown and described.

37. In a basket-making machine, the combination with a basket-form, of a stave-receptacle, chains engaging the upper edges of the staves in the receptacle and chains for engaging the lower edges of the staves, rotating disks against which said staves are pressed by the chains, which disks have projections on the rims, for engaging the staves and chains for conveying the staves to the form, substantially as herein shown and described.

38. In a basket-making machine, the combination with a basket-form, of a stave-receptacle, in which the staves are held on edge, chains for shifting said staves forward, rotating conveyer-disks against the edges of which the staves are pressed by the chains, and means for operating said disks and chains intermittently from the main shaft of the machine, substantially as herein shown and described.

39. In a machine for making baskets, the combination with a basket-form having less diameter at one end than at the other, the diameter of the form midway between the ends being less than would be the diameter of such a form having the edges of the two ends connected by straight lines, of a pressure-roller bearing on the staves midway between the ends to press the basket material inward on a concave line between the top and bottom ends of the basket, substantially as herein shown and described.

40. In a machine for making baskets, the combination with a rotary basket-form provided at one end with a notch in its rim and with a lateral projection below said notch, a receptacle for hoop-strips, a slide for removing the hoop-strips laterally from the bottom of the receptacle into the path of the projection on the form, a spring-driver for throwing the strips into the notch in the forms, and means for automatically releasing said driver, substantially as herein shown and described.

41. In a machine for making baskets, the combination with a rotary basket-form, provided at one end with a notch in its rim and with a lateral projection below said notch, a receptacle for hoop-strips, a slide for removing the hoop-strips laterally from the bottom of the receptacle into the path of the projection on the form, a spring-driver for throwing the strips into the notch in the forms and means for automatically releasing said driver and means on said slide for withdrawing said spring-driver, substantially as herein shown and described.

42. In a machine for making baskets, the combination with intermittently-rotated basket-forms, of means for automatically feeding and applying basket material intermittently to said forms, means for automatically locking such material-feeding means against movement during the interval in the rotation of the forms, and means for automatically unlocking such material-feeding means, substantially as herein shown and described.

43. In a machine for making baskets, the combination with intermittently-rotated basket-forms, of means for automatically feeding and applying basket material to said forms intermittently, means for locking the material-feeding devices between the intermittent feeds and means for automatically applying securing devices on the material on the basket-form during the stoppage and locking of the material-feeding means, and means for automatically unlocking said feeding means, substantially as herein shown and described.

44. In a machine for making baskets, the combination with a basket-form having pins at one end, of a swinging basket-bottom support, means for swinging said bottom-support from the horizontal to the vertical position, and means for pressing a bottom on said support against the pins on the forms when the support is in vertical position, substantially as herein shown and described.

45. In a machine for making baskets, the combination with a basket-form having less diameter at one end than at the other, the diameter of the form midway between the ends being less than would be the diameter of such form having the edges of the two ends connected by straight lines, of means for applying basket material on said forms and securing the basket material together while on the forms and a pressure device bearing on the basket material midway between the ends of the form to press the basket material inward on a curved line between the two ends of the form, substantially as herein shown and described.

46. In a basket-making machine, the combination with a form, of chains for conveying staves and hoop-strips to the form, grippers on said chains for gripping the hoop-strips, receptacles for the hoop-strips, a reciprocating slide for shifting the ends of the hoop-strips laterally into the paths of the grippers, a cam-lever connected with the slide and a cam-wheel for actuating the cam-lever, substantially as herein shown and described.

47. In a basket-making machine, the combination with a form, of means on the form for clenching-staples, means for applying staves, hoops and basket-bottoms on the form, a staple-driving mechanism, means for adjusting inclination of said staple-driving mechanism to the form, and means for lowering said staple-driving mechanism upon the work once for each stave on the form, substantially as herein shown and described.

48. In a basket-making machine, the combination with a basket-form, of a hopper for basket-bottoms, a slide for removing the basket-bottoms successively from the hopper, means for operating said slide, a tilting plate for receiving, holding and tilting up the bottoms and means for operating the tilting plate, substantially as herein shown and described.

49. In a basket-making machine, the combination with a form having means at one end for engaging the basket-bottom, of a striker for driving a basket-bottom against said means, a spring acting on said striker and mechanism for automatically bringing said spring in tension and then releasing it to drive the striker against the basket-bottom on the form, substantially as herein shown and described.

50. In a basket-making machine, the combination with a basket-form, of a stave-receptacle in which the staves are held, chains engaging the edges of the staves to feed them forward, rotating disks against which the staves are pressed by the chains, which disks have rim projections for engaging the staves and chains for moving the staves from said disks to the form, substantially as herein shown and described.

51. In a basket-making machine, the combination with a basket-form, of a stave-receptacle, means for feeding the staves forward in said receptacle, rotating disks against which the staves are pressed by said means, which disks have rim projections for engaging the staves and means for moving the staves from said disks to the form, substantially as herein shown and described.

52. A basket-making machine having rotary forms and means for first applying automatically a basket-bottom, and an inner hoop for the open end of the basket on said form, means for then shifting the forms into another position and means for then applying automatically staves, outer hoops and securing devices on said form and the inner hoop and basket-bottom thereon, substantially as herein shown and described.

53. In a basket-making machine, the combination with a form, of chains and lugs on said chains for conveying staves to the form and chains having grippers on said chains for gripping and feeding hoop-strips to the form and a track adjacent to each chain for holding them down on the hoop-strips and staves, substantially as herein shown and described.

54. In a basket-making machine, the combination with a basket-form having a central pin and retaining-pin on one end, of a hopper for basket-bottoms, means for successively removing the bottoms from said hopper, a tilting plate for receiving, holding and tilting up the bottoms, and means for tilting said plate and pushing the bottoms against the retaining-pins, substantially as herein shown and described.

55. In a machine for making baskets, the combination with a form, of disks provided on the rims with projections for engaging the edges of staves placed on edge, means for pressing the staves against the disk and lifting the staves and automatically-operated pins on said disks for engaging the staves, and means for conveying the staves from the disks to the form, substantially as herein shown and described.

56. In a machine for making baskets, the combination with a form, of disks provided on the rims with projections for engaging the edges of staves placed on edge and lifting the staves, means for pressing the staves against the disk, automatically-operated pins on said disks for engaging the staves, and means for automatically withdrawing said pins and releasing them and springs acting on the pins, and means for conveying the staves from the disks to the forms, substantially as herein shown and described.

57. In a machine for making baskets, the combination with forms, of means for rotating said forms automatically, means on the forms for clenching staples, means for applying basket material to said forms automatically, means for feeding, cutting, forming and applying, and clenching securing devices, made from wire, on the basket material on the forms, automatically, a worm on the main shaft, a worm-wheel engaged by said worm, means for driving the form-rotating mechanism, the material-feeding mechanism and the material-securing mechanism from said main shaft, all but the last through said worm, the worm having a part of each thread at right angles to the longitudinal axis of the main shaft, substantially as herein shown and described.

58. In a machine for making baskets, the combination with a rotary basket-form having a notch in its rim at one end and a lateral projection below said notch, of a receptacle for hoop-strips, a slide for removing the strips laterally from the bottom of the receptacle, a spring-driver for throwing the hoop-strips into the notch in the form, a latch for locking said spring-driver which latch is in the path of the rising hoop-strip engaged by the form, substantially as herein shown and described.

59. In a machine for making baskets, a form of generally circular cross-section but interrupted by flattened portions in its rim parts having anvils with clenching-recesses in said flattened portions, substantially as herein shown and described.

60. In a machine for making baskets, the combination with a rotary basket-form provided at one end with a notch in its rim and with a lateral projection below said notch, of a receptacle for hoop-strips, a slide for removing the hoop-strips laterally from the bottom of the receptacle into the path of the projection on the form and means for operating such slide, a spring-driver for throwing the strips into the notch in the forms, means for automatically releasing said driver and means on said slide for withdrawing said spring-driver and means for automatically locking said spring-driver in place substantially as herein shown and described.

61. In a machine for making baskets, the combination with a form, of disks provided on the rims with projections for engaging the edges of staves placed on edge and lifting the staves, automatically-operated pins on said disks for engaging the staves, and means for automatically withdrawing said pins and forcing them in the staves on the disks, and means for conveying the staves from the disks to the forms, substantially as herein shown and described.

62. In a basket-making machine, a tapering form provided along its larger end with a flange having a notch and a toe adjacent to said notch, in combination with a trigger to be tripped from said toe, a spring for feeding a hoop, which spring can be released by said trigger, substantially as herein shown and described.

63. In a machine for making baskets, the combination with a plurality of movable forms, of means on the forms for clenching securing devices, means for applying automatically basket material to said forms, means for applying securing devices to said basket material while on the form, at intervals, means for locking the form against movement while the securing devices are applied on the basket material and for locking the material feeding and applying devices while the securing devices are being applied, substantially as herein shown and described.

64. In a machine for making baskets, the combination with a plurality of movable basket-forms, of means for clenching staples on the forms, means for applying basket material automatically to said forms, and means for applying securing devices to said material on the basket-form, automatically, and means for automatically lowering the securing mechanism upon the form while the securing devices are applied and clenched, means for automatically raising the securing mechanism from the form at intervals between the application of the securing devices, substantially as herein shown and described.

65. In a machine for making baskets, the combination with a plurality of intermittently-rotated basket-forms, of means for automatically feeding and applying basket material intermittently to said form, and means for automatically locking such material-feeding means against movement, at intervals, substantially as herein shown and described.

66. In a machine for making baskets, the combination with a plurality of intermittently-rotated basket-forms, of means on the forms for clenching staples, a plurality of stapling mechanism, means for automatically feeding and applying basket material to said forms intermittently, means for locking the material-feeding devices between the intermittent feeds, and means for automatically applying securing devices on the material on the basket-form during the stoppage and locking of the material-feeding means, substantially as herein shown and described.

67. In a machine for making baskets, the combination with a plurality of rotating basket-forms, means for automatically applying basket material on the forms, means for bringing the material automatically to such a position as to be applied, means for nailing the staves to the hoops and bottoms successively as said hoops and staves are applied, power-operated means for moving the forms to and from the nailing means, and means for ejecting and removing completed baskets from the forms, substantially as herein shown and described.

68. In a machine for making baskets, the combination with stave-feeding disks, of projections on their rims for engaging the edges of staves, movable spring-pressed pins in the disks for engaging the staves, levers for withdrawing said pins and a cam for tripping said levers, substantially as herein shown and described.

69. In a machine for making baskets having upright staves, stave-feeding disks divided into as many spaces as there are staves plus one, all the spaces excepting one being of equal size and this one space being wider than the remaining and spurs for engaging staves in all the spaces except the largest one, substantially as herein shown and described.

70. In a machine for making baskets, the combination with disks, for feeding staves transversely to the longitudinal axis of the staves, and means for giving the staves yielding tension against the disks, of conveyer-chains for carrying the staves forward transversely to their longitudinal axis from said disks, the chains being located to receive the staves as they leave the disks, substantially as herein shown and described.

71. In a machine for making baskets, the combination with feed-disks for staves, which disks are provided on their ends with projections for engaging the edges of the staves, pins mounted movably in the disks for engaging the staves and holding them on the rims of the disks, and means for automatically operating said pins, substantially as herein shown and described.

72. In a basket-making machine, the combination with a shaft and a sleeve on said shaft, of a spring-pawl on an arm of said shaft, a ratchet-wheel on the sleeve engaged by said pawl, a fixed rod for tripping the pawl for each rotation of the shaft, a form-carrier mounted loosely on the shaft, rotary forms on said carrier, a cog-wheel on each form, a cog-wheel on the sleeve, engaging the cog-wheels on the forms, the cog-wheel on the sleeve having more teeth than the cog-wheels on the forms and means for applying staves, hoops and basket-bottoms on the forms, substantially as herein shown and described.

73. A basket-making machine having a rotating shaft, a form-carrier loosely mounted on said shaft, forms on said carrier, gearing for rotating the forms, a sleeve on said shaft, which sleeve operates said gearing, means for rotating the sleeve with the shaft, means for disengaging the shaft at intervals and means for applying hoops, staves and basket-bottoms on the forms, substantially as herein shown and described.

74. In a basket-making machine, the combination with a driven shaft, of a worm on said shaft, the thread of which worm has a part of each turn of the thread substantially at right angles to the longitudinal axis of the shaft, a worm-wheel engaging said worm, a form-carrier, a form-carrier shaft, which form-carrier shaft carries said worm-wheel, rotary forms on the form-carrier, means for driving such forms from said carrier-shaft, and means for applying staves, hoops and basket-bottoms on the forms, substantially as herein shown and described.

75. In a basket-making machine, the combination with a shaft, of a form-carrier, forms on the same, a hopper for basket-bottoms, a slide for removing the basket-bottoms from the hopper, which slide is operated from the said shaft, a tilting-plate for receiving and tilting up the bottoms and means for operating the tilting-plate from said shaft, substantially as herein shown and described.

76. A basket-making machine, having a rotating shaft, a form-carrier loosely mounted on said shaft, forms on said carrier, gearing for rotating said forms, a sleeve on the driving-shaft, for operating said gearing, a pawl and ratchet for rotating said sleeve from the shaft, means for throwing out said pawl at intervals and means for applying basket-bottoms, hoops and the staves on said forms, substantially as herein shown and described.

77. In a basket-making machine, the combination with a hopper for basket-bottoms, of a rotating form-carrier, forms on the same, a slide for removing the bottoms from the hopper, a tilting-plate, a lever on said plate, bottom-ejecting means operated by said lever, and means for operating said lever, substantially as herein shown and described.

78. In a machine for making baskets, the combination with a basket-bottom hopper, of a swinging support for basket-bottoms, which support has an automatic bottom-holding clutch mechanism, means for swinging said support from a vertical to a horizontal position, and means for conveying the bottoms from the hopper upon said support, substantially as herein shown and described.

79. In a machine for making baskets, the combination with a swinging basket-bottom support, of means on the same for holding the bottoms in place on said support, means for swinging the support from vertical to horizontal position and means for advancing the bottoms on said support when the support is in a horizontal position, substantially as herein shown and described.

80. In a machine for making baskets, the combination with a basket-bottom hopper, of a swinging bottom-support and means for automatically swinging the same from horizontal to vertical position and means for automatically conveying the bottoms from the hopper to said support, substantially as herein shown and described.

81. In a machine for making baskets, the combination with a basket-bottom hopper, of a swinging support for basket-bottoms, which support has a bottom-holding mechanism, means for swinging said support from horizontal to vertical position and means for conveying the bottoms from the hopper upon said support, substantially as herein shown and described.

82. In a machine for making baskets, the combination with a basket-form and a swinging basket-bottom support, of means on the same for holding the bottom in place on said support, mechanism for swinging the support from horizontal to vertical position and means for automatically forcing the bottom off said support when the support is in vertical position, substantially as herein shown and described.

83. In a machine for making baskets, the combination with a frame, of a main driving-shaft, a transverse shaft driven from the main driving-shaft, a form-carrier, forms thereon, basket-material feeding and applying means all operated from said transverse shaft and a material-securing mechanism operated from the main shaft, and means for controlling the operation of the latter independent of the others, substantially as herein shown and described.

84. In a machine for making baskets, the combination with a main frame, of a rotary form-carrier, forms mounted on said carrier, means for properly supplying staves, hoops and basket-bottoms to said forms, mechanism for applying securing devices to said staves, hoops and bottoms and means for bringing one form into operative position with relation to said devices and withdrawing another, substantially as herein shown and described.

85. In a machine for making baskets, the combination with a main frame, a rotary form-carrier supported therein gearing for rotating the same, forms mounted on said carrier, means for properly supplying hoops, staves and basket-bottoms to said forms, mechanisms for applying and clenching securing devices to said staves, hoops and bottoms and means for bringing one form into operative position to said devices and withdrawing another and means for removing completed baskets from said forms, substantially as herein shown and described.

86. A basket-making machine, the combination with a main frame, a shaft loosely mounted therein, means for rotating the same, a rotating form-carrier mounted on said shaft, means for rotating the same intermittently, forms on said carrier, means for applying staves, hoops and basket-bottoms on said forms while the same are rotating, and mechanism for applying securing devices to said hoops, staves and bottoms on said forms when at rest, means for producing such relative motion of the forms as to wind the hoops on the forms more than a complete circumference of the form, means for removing completed baskets from said forms, substantially as herein shown and described.

87. In a machine for making baskets, the combination with a frame, of a transverse shaft mounted in the same, a main driving-shaft, gearing for rotating the transverse shaft from the main driving-shaft, a form-carrier mounted loosely on the transverse shaft, gearing for rotating the form-carrier from the main shaft, means for throwing said gearing in and out of gear with the main shaft, a cam-disk on the transverse shaft for operating said means, a sprocket-wheel fixed on the transverse shaft, a stave-feeding mechanism and an outer-strip-feeding mechanism all operated from said sprocket-wheel, a bottom feeding and applying mechanism, means actuated from said transverse shaft for operating said bottom feeding and applying mechanism, an inner-hoop-strip-feeding mechanism and means for operating said inner-hoop-strip-feeding mechanism from the transverse shaft, means for rotating forms axially and mechanism for operating said form-rotating means from said transverse shaft, substantially as herein shown and described.

88. In a basket-making machine, the combination with a hoop-strip receptacle, of a slide for shifting the ends of a strip laterally, a spring-pressed lever having a toe at its end, a latch for engaging said toe, an actuated connection between said lever and slide and a rotating basket-form having a disk provided with a notch and a toe at said notch, substantially as herein shown and described.

89. In a basket-making machine, the combination with a receptacle for staves and receptacles for hoop-strips, of intermittently-moving chains for forcing the staves forward in the receptacle, a slide for shifting the ends of the hoop-strips laterally, and a cam-wheel for actuating the said slide and the mechanism for operating the stave-feed chains intermittently, substantially as herein shown and described.

90. In a machine for making baskets, the combination with receptacles for strips for forming the outer hoops, of a form for receiving the hoops and staves, chains for conveying the hoop-strips to said form, and means for shifting said outer hoop-strips from the receptacles into the path of the chains, substantially as herein shown and described.

91. In a machine for making baskets, the combination with an intermittently-rotating form-carrier and a plurality of forms thereon, ledges for supporting staves, means for moving the staves transversely to their length while resting flat on said ledges and spring-fingers above and below the moving staves for guiding them to the basket-form, and retaining them as the form moves to position, substantially as herein shown and described.

92. In a machine for making baskets, the combination with an inclined frame, of means for ejecting baskets upon such frame, means on said frame for lifting the ejected baskets to the upper end of the frame and a hinged basket-support at the upper end of the inclined lifting-frame, substantially as herein shown and described.

93. In a machine for making baskets, the combination with an inclined frame, of means for ejecting the baskets upon such frame, means on said frame for lifting the ejected baskets to the upper end of the frame, a hinged basket-support at the upper end of the inclined lifting-frame, spring-bars for engaging the upper end of the basket and exerting a downward pressure on the same, substantially as herein shown and described.

94. In a machine for making baskets, the combination with an inclined frame, of means for ejecting the baskets upon such frame, means on said frame for lifting the ejected baskets to the upper end of the frame, a hinged basket-support at the upper end of the inclined lifting-frame, a circular frame at the upper end of the inclined frame and surrounding the hinged support and provided with downwardly-extending guide-rods, a spring-frame for exerting a downward pressure on the open end of the basket while the same is in the hinged support-frame, substantially as herein shown and described.

95. In a machine for making baskets, the combination with an inclined frame, of means for ejecting the baskets upon said inclined frame with the closed bottom end to the top and the open end at the bottom, means for carrying the baskets to the upper end of this frame in this position, and means for reversing the baskets automatically at the upper end of the inclined frame so as to bring the bottom downward and the open end to the top, and means for ejecting said baskets from the lifting device at the upper end of the inclined frame, substantially as herein shown and described.

96. In a machine for making baskets, the combination with an automatic movable form-carrier, mounted in a frame, of a plurality of horizontally-rotated basket-forms on the carrier, a receptacle for basket-bottoms, a receptacle for inner hoop-strips, a receptacle for staves, a receptacle for outer hoop-strips, and receptacles for wire, means for advancing and applying the basket-bottom and inner hoop-strip on a form, and means for advancing and applying the staves and outer hoop-strips on the form at a later period, means for feeding, cutting and forming driving and clenching devices made from wire on the material on the form, and means for removing the completed basket from the form, substantially as herein shown and described.

97. A basket-making machine having a form-carrier and forms on the same, means for giving the form-carrier intermittent motion to change the positions of the forms, means for rotating said forms on their own axis intermittently only, means for automatically feeding, cutting and forming staples from wire during the feeding of the material on the forms and driving and clenching staples on the same on the forms during the interruption of the rotary movement of the forms, substantially as herein shown and described.

98. A basket-making machine having a movable form-carrier, basket-forms on the same, means for rotating the forms intermittently on their own axis, means for automatically applying bottom hoops and staves on the forms, a plurality of staple forming and driving mechanisms, means for feeding, cutting, forming and driving staples made from wire through the hoops, staves and in the bottom on the form and means for automatically operating mechanisms to drive and clench staples during the intermissions of the rotary movements of the form on its axis, only, substantially as herein shown and described.

99. In a machine for making baskets, the combination with a form-carrier and means for moving the same automatically, of a plurality of forms on the form-carrier and means for rotating the same automatically, a plurality of staple forming and driving mechanisms, a receptacle for basket-bottoms, a receptacle for inner hoop-strips, receptacles for staves, receptacles for outer hoop-strips and receptacles for wire, means for applying the basket-bottoms and the inner hoop-strip on a form, and means for applying staves on the form at a later period and feeding outer hoop-strips upon the staves while the staves are being applied on the form, means for operating the stapling mechanisms to feed, cut, form and drive staples made from wire, for securing together the basket material on the form, substantially as herein shown and described.

100. In a basket-making machine, the combination with a form-carrier, of a plurality of rotated basket-forms on the same, each form having bottom supporting and retaining means at one end, a receptacle for bottoms, means for removing the bottoms from the receptacle to a support, means for rotating the form-carrier and forms in the path of the bottom-support, means for applying the bottoms to the supporting and retaining means on the forms, and means for rotating the bottoms with the forms, substantially as herein shown and described.

101. In a machine for making baskets, the combination with a form-carrier, of means for turning the same automatically, basket-forms mounted on said carrier, means for turning them automatically, a plurality of staple forming and driving mechanisms, means for feeding basket material to the forms automatically, means for forming and applying the securing devices on said basket material on the forms automatically, a worm on the main driving-shaft, a worm-wheel engaging said worm, all the above mechanism being driven from the main shaft, said worm having a part of each thread extending at right angles to the longitudinal axis of the main shaft, substantially as herein shown and described.

102. In a basket-making machine, the combination with a form, of means on the form for clenching staples, means for applying staves, hoops and basket-bottoms on the form, a plurality of forming and staple-driving mechanisms, means for automatically lowering and adjusting each staple forming and driving mechanism to the work independently of the other and means for lowering each stapling mechanism upon the hoops for each stave on the form, substantially as herein shown and described.

103. In a machine for making baskets, the combination with a plurality of staple forming and driving mechanisms, a plurality of movable basket-forms, of means for clenching staples on the forms, means for applying basket material automatically to said forms, and means for forming and applying the securing devices to said material on the basket-form, automatically, and means for automatically lowering the securing mechanisms upon the material on the form while the securing devices are applied and clenched, means for automatically raising the securing mechanism from the form at intervals between the application of the securing devices, and the applying of the staves and hoops on the form, substantially as herein shown and described.

104. A basket-making machine having a rotating shaft, a form-carrier loosely mounted on said shaft, forms on said carrier, gearing for rotating the forms, a plurality of staple forming and driving mechanisms, a sleeve on said shaft, which sleeve operates said gearing, means for rotating the sleeve with the shaft, means for disengaging the shaft at intervals and means for applying hoops, staves and basket-bottoms and securing devices on the forms, substantially as herein shown and described.

105. In a machine for making baskets, the combination with a frame, of a transverse shaft mounted in the same, a main driving-shaft, a plurality of staple forming and driving mechanisms operated from the same, gearing for rotating the transverse shaft from the main driving-shaft, a form-carrier mounted loosely on the transverse shaft, gearing for rotating the form-carrier from the main shaft, means for throwing said gearing in and out of gear with the main shaft, a cam-disk on the transverse shaft for operating said means, forms on the carrier, means fixed on the transverse shaft, a stave-feeding mechanism and an outer-strip-feeding mechanism all operated from said means, a bottom feeding and applying mechanism, means actuated from said transverse shaft for operating said bottom feeding and applying mechanism, an inner-hoop-strip-feeding mechanism and means for operating said inner-hoop-strip-feeding mechanism from the transverse shaft, means for rotating forms axially and mechanism for operating said form-rotating means from said transverse shaft, substantially as herein shown and described.

106. In a basket-making machine, the combination with a plurality of basket-forms, of an interrupted worm, means for rotating the worm and means for rotating the basket-forms from said worm, substantially as herein shown and described.

Signed at Newton, in the county of Sussex and State of New Jersey, this 1st day of June, A. D. 1901.

JOHN FARRELL.

Witnesses:
GEO. C. BATES, Jr.
O. W. COOKE.